US012732949B2

(12) United States Patent
Lee et al.

(10) Patent No.: US 12,732,949 B2
(45) Date of Patent: Sep. 8, 2026

(54) METHOD AND DEVICE FOR CONTROLLING POSITIONING ACCORDING TO MOVEMENT OF TERMINAL IN WIRELESS COMMUNICATION SYSTEM

(71) Applicant: Samsung Electronics Co., Ltd., Suwon-si (KR)

(72) Inventors: Jicheol Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 675 days.

(21) Appl. No.: 17/914,581

(22) PCT Filed: Mar. 30, 2021

(86) PCT No.: PCT/KR2021/003899
§ 371 (c)(1),
(2) Date: Sep. 26, 2022

(87) PCT Pub. No.: WO2021/201552
PCT Pub. Date: Oct. 7, 2021

(65) Prior Publication Data

US 2023/0199704 A1 Jun. 22, 2023

(30) Foreign Application Priority Data

Mar. 30, 2020 (KR) ........................ 10-2020-0038640

(51) Int. Cl.
*H04W 64/00* (2009.01)
*G01S 1/06* (2006.01)

(52) U.S. Cl.
CPC ............ *H04W 64/003* (2013.01); *G01S 1/06* (2013.01)

(58) Field of Classification Search
CPC ..... H04M 15/66; H04M 15/60; H04W 24/10; H04W 24/02; H04W 4/029; H04W 48/18;
(Continued)

(56) References Cited

U.S. PATENT DOCUMENTS 1,124,085 A * 1/1915 Welch ..................... F24C 3/085 126/39 F
8,929,918 B2 1/2015 Siomina et al.
(Continued)

FOREIGN PATENT DOCUMENTS

EP 3 535 989 A1 9/2019
JP 2019-533959 A 11/2019
(Continued)

OTHER PUBLICATIONS

Intel Corporation et al., Introduction of NR positioning, R2-2002399, 3GPP TSg-RAN WG2 Meeting #109 electronic, Mar. 11, 2020, Elbonia.

(Continued)

*Primary Examiner* — Joseph Arevalo
(74) *Attorney, Agent, or Firm* — Jefferson IP Law, LLP

(57) ABSTRACT

The present disclosure relates to a wireless communication system and, more specifically, to a method and a device for providing a location information service in a cellular wireless communication system (5G system). According to an embodiment of the present disclosure, a method for measuring the location in an UE in a mobile communication system may comprise the steps of: receiving, from a location management function (LMF) device in the mobile communication system, UE positioning performance information including a surrounding target area and an UE positioning method; receiving system information from a base station in the mobile communication system; identifying whether the UE is included in the surrounding target area on the basis of (Continued)

the received positioning performance information and system information; determining a positioning method on the basis of the received UE positioning performance information when the UE is located within the surrounding target area; performing positioning of the UE by using the determined positioning method; and transmitting a result of the positioning to the LMF device.

6 Claims, 19 Drawing Sheets

(58) Field of Classification Search
CPC ....... H04W 64/00; H04W 28/24; H04W 4/40; H04W 76/14; H04W 8/04; H04W 4/46; H04W 4/90; H04W 12/06; H04W 4/20; H04W 4/70; H04W 8/02; H04W 8/22; H04W 88/04; H04W 16/28; H04W 28/0268; H04W 64/003; H04W 76/11; H04W 76/20; H04W 8/065; H04W 8/12; H04W 12/03; H04W 4/02; H04W 4/24; H04W 4/44; H04W 48/14; H04W 52/0216; H04W 60/04; H04W 72/543; H04W 8/20; H04W 88/18; H04W 36/0011; H04W 4/80; H04W 40/00; H04W 48/16; H04W 52/0235; H04W 60/06; H04W 68/005; H04W 68/02; H04W 76/16; H04W 88/16; H04W 12/122; H04W 24/08; H04W 28/02; H04W 48/02; H04W 48/08; H04W 60/00; H04W 68/04; H04W 72/51; H04W 76/12; H04W 76/28; H04W 8/18; H04W 80/10; H04W 88/06; H04W 12/10; H04W 12/121; H04W 12/61; H04W 12/63; H04W 16/02; H04W 16/14; H04W 28/18; H04W 36/0033
USPC ........... 370/252; 455/419, 456.1, 456.3, 522, 455/434, 453, 406, 432.1, 435, 440
See application file for complete search history.

(56) References Cited

U.S. PATENT DOCUMENTS 11,696,095 B2* 7/2023 Edge ..................... H04W 64/00 455/456.2
2016/0277883 A1* 9/2016 Jeon ........................ H04W 4/02
2018/0368097 A1 12/2018 Singh et al.
2020/0053638 A1* 2/2020 Edge ..................... H04W 48/16
2021/0029509 A1 1/2021 Zhu et al.
2021/0144539 A1* 5/2021 Edge .................. H04B 7/18526
2022/0086942 A1* 3/2022 Zhu ....................... H04W 76/19
2022/0240237 A1* 7/2022 Park ........................ H04W 4/70
2022/0338203 A1* 10/2022 Cha ...................... H04B 17/309
2023/0007556 A1* 1/2023 Qiao .................. H04W 36/322

FOREIGN PATENT DOCUMENTS

KR 10-2019-0077382 A 7/2019
WO 2007/016859 A1 2/2007
WO 2019/196817 A1 10/2019

OTHER PUBLICATIONS

Intel Corporation , Email discussion report on [104#35][NR] Positioning SI (Intel), R2-1900753, 3GPP TSG RAN WG2 Meeting #105, Feb. 15, 2019, Athens, Greece.
Intel Corporation et al., Running CR for the introduction of NR positioning, R2-2002241, 3GPP TSG-RAN WG2 Meeting #109 electronic, Mar. 11, 2020, Elbonia.
Qualcomm Incorporated, TP for 38.305 Baseline CR: Transmission Measurement Function in NG-RAN, R2-1913396, 3GPP TSG-RAN WG2 Meeting #107bis, Oct. 4, 2019, Chongqing, China.
3rd Generation Partnership Project; Technical Specification Group Services and System Aspects; Service requirements for the 5G system; Stage 1 (Release 17), 3GPP TS 22.261 V17.1.0, Valbonne, France, Dec. 27, 2019.
3rd Generation Partnership Project; Technical Specification Group Services and System Aspects; Universal Geographical Area Description (GAD) (Release 15), 3GPP TS 23.032 V15.1.0, Valbonne, France, Sep. 17, 2018.
Extended European Search Report dated Jul. 18, 2023, issued in a European Patent Application No. 21780264.4.
Keating Ryan et al.; Overview of Positioning in 5G New Radio, 16th International Symposium on Wireless Communication Systems (ISWCS), IEEE, pp. 320-324, XP033636268, DOI: 10.1109/ISWCS.2019.8877160, Aug. 27, 2019.
Qualcomm: NB-IOT/eMTC access to Non-Public Networks (NPN), 3GPP TSG RAN #86; RP-192422; Dec. 9-12, 2019; Sitges, Spain; Dec. 1, 2019.
Nokia et al.; Discussion of PRS-Based Beacon for Indoor Positioning; 3GPP TSG RAN WG1 Meeting #86bis; R1-1610427; Lisbon, Portugal; Oct. 10-14, 2016.
Japanese Office Action with English translation dated Dec. 24, 2024; Japanese Appln. No. 2022-559769.
Korean Office Action with English translation dated Jun. 30, 2025; Korean Appln. No. 10-2020-0038640.
Korean Office Action with English translation dated Mar. 6, 2026; Korean Appln. No. 10-2020-0038640.

* cited by examiner

FIG. 1

UE
101
Uu
N1
N2
NG-C
TRP
gNB or
ng-gNB
210
Xn
TRP
gNB or
ng-gNB
220
L-IF
LMC
(Local LMF)
230
200
AMF
301
UDM
302
N8
NL6
NL2
N51
GMLC
(LRF)
310
NL5
NEF
305
Le
LCS
Client
306
N33
AF
307

Figure 6A:
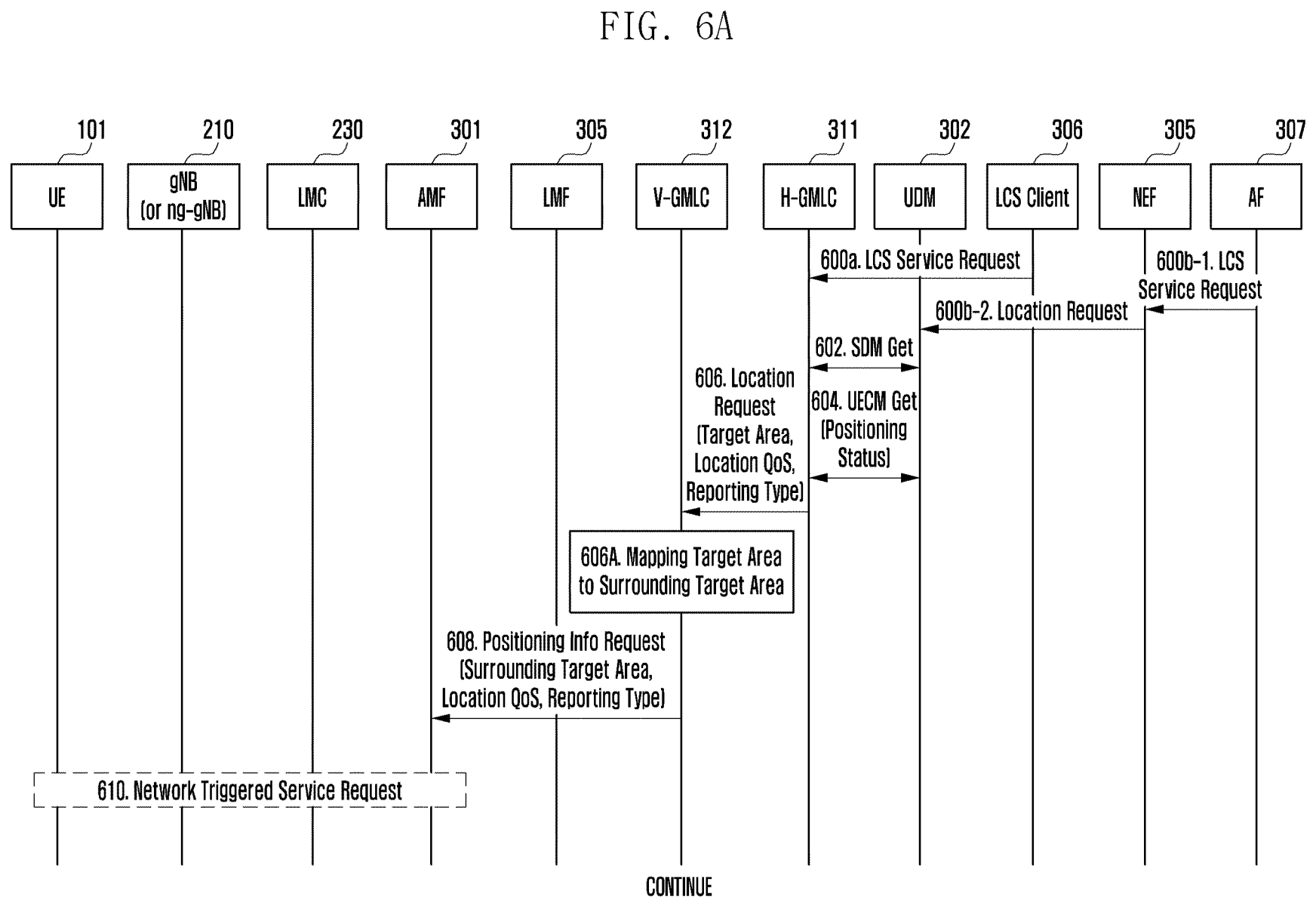

307 AF
305 NEF
306 LCS Client
302 UDM
311 H-GMLC
312 V-GMLC
305 LMF
301 AMF
230 LMC
210 gNB (or ng-gNB)
101 UE 600b-1. LCS Service Request
600b-2. Location Request
600a. LCS Service Request
602. SDM Get
604. UECM Get (Positioning Status)
606. Location Request (Target Area, Location QoS, Reporting Type)
606A. Mapping Target Area to Surrounding Target Area
608. Positioning Info Request (Surrounding Target Area, Location QoS, Reporting Type)
610. Network Triggered Service Request

Figure 7A:
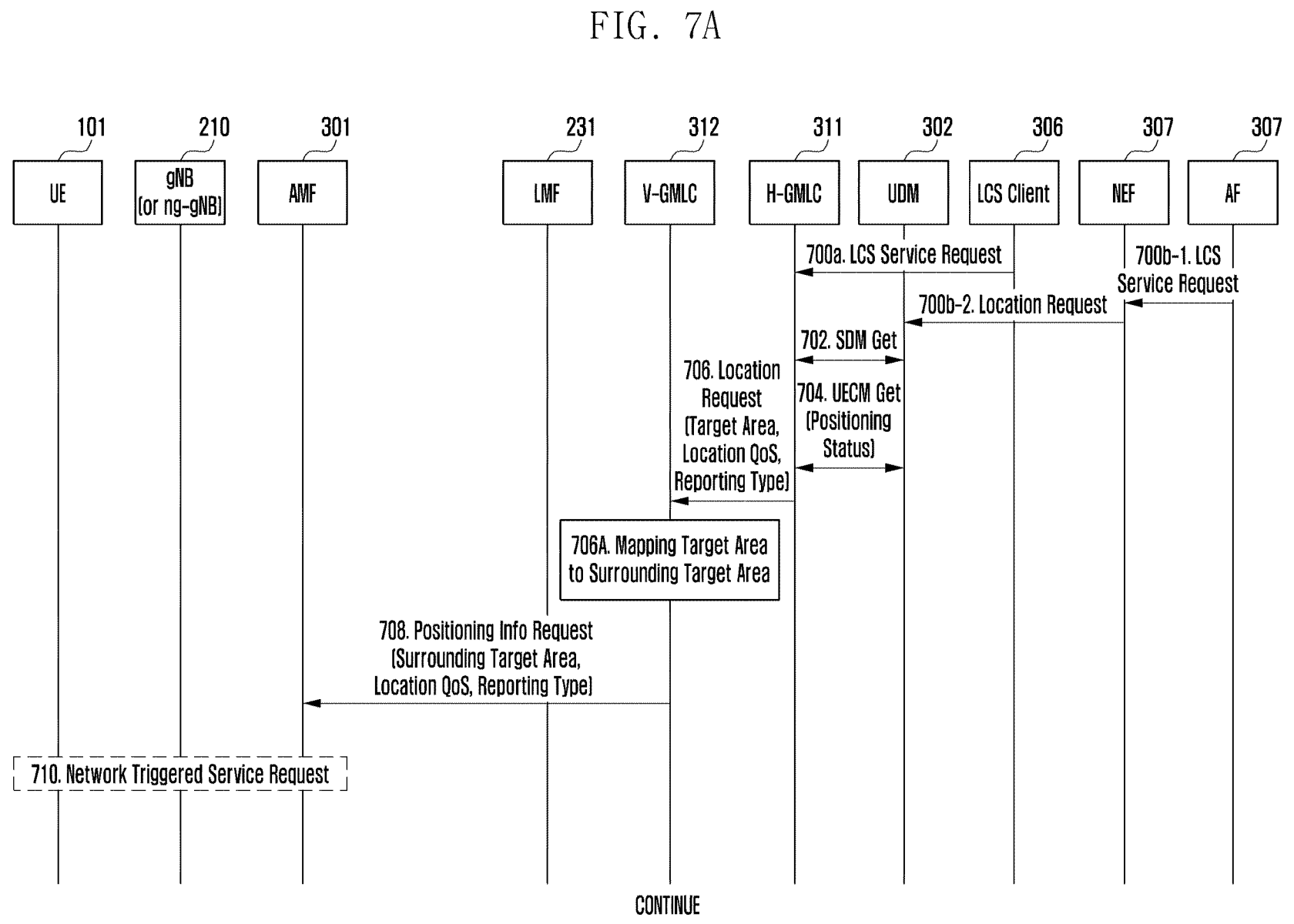

UE 101
gNB (or ng-gNB) 210
AMF 301
LMF 231
V-GMLC 312
H-GMLC 311
UDM 302
LCS Client 306
NEF 307
AF 307

700b-1. LCS Service Request
700b-2. Location Request
700a. LCS Service Request
702. SDM Get
704. UECM Get (Positioning Status)
706. Location Request (Target Area, Location QoS, Reporting Type)
706A. Mapping Target Area to Surrounding Target Area
708. Positioning Info Request (Surrounding Target Area, Location QoS, Reporting Type)
710. Network Triggered Service Request

Figure 7B:
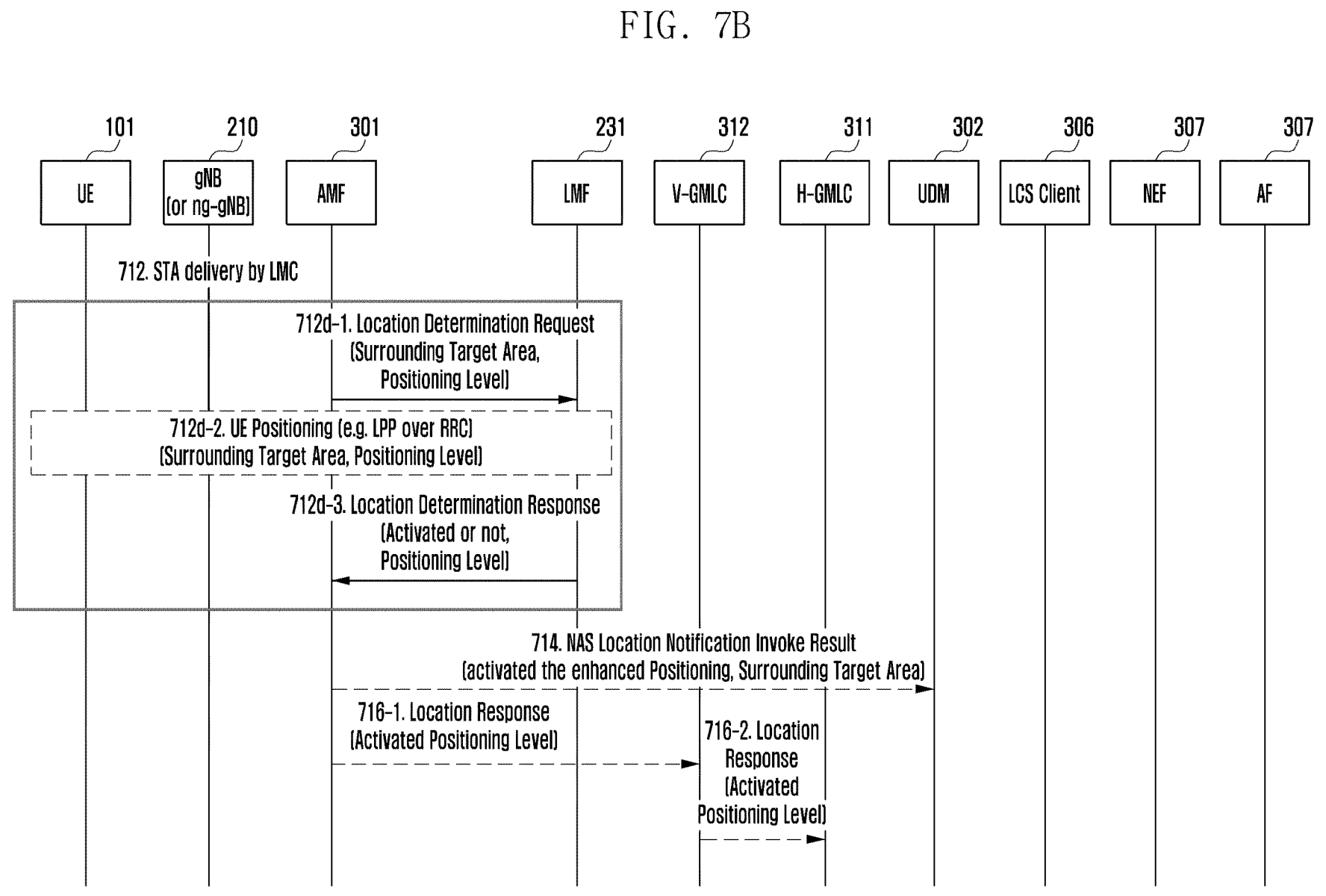

UE 101
gNB (or ng-gNB) 210
AMF 301
LMF 231
V-GMLC 312
H-GMLC 311
UDM 302
LCS Client 306
NEF 307
AF 307

712. STA delivery by LMC 712d-1. Location Determination Request (Surrounding Target Area, Positioning Level)

712d-2. UE Positioning (e.g. LPP over RRC) (Surrounding Target Area, Positioning Level)

712d-3. Location Determination Response (Activated or not, Positioning Level)

714. NAS Location Notification Invoke Result (activated the enhanced Positioning, Surrounding Target Area)

716-1. Location Response (Activated Positioning Level)

716-2. Location Response (Activated Positioning Level)

1) Ellipsoid Point

2) Ellipsoid Point with Altitude

3) Uncertainty ellipse

METHOD AND DEVICE FOR CONTROLLING POSITIONING ACCORDING TO MOVEMENT OF TERMINAL IN WIRELESS COMMUNICATION SYSTEM

TECHNICAL FIELD

The disclosure relates to a wireless communication system, and more particularly, to a method and a device for providing a position information service in a cellular wireless communication system (5G system).

BACKGROUND ART

To meet the increasing demand for wireless data traffic since the deployment of 4G communication systems, efforts have been made to develop an improved 5th generation (5G) or pre-5G communication system. Therefore, the 5G or pre-5G communication system is also called a "beyond 4G network" communication system or a "post long term evolution (LTE) system."

Implementation of the 5G communication system in ultrahigh frequency (mmWave) bands, e.g., 60 GHz bands, is being considered in order to accomplish higher data rates. To mitigate a path loss of radio waves in the ultrahigh frequency bands and increase the transmission distance on the radio waves in the ultrahigh frequency bands, technologies of beamforming, massive multiple-input multiple-output (massive MIMO), full dimensional MIMO (FD-MIMO), array antenna, analog beamforming, and large scale antennas have been discussed for 5G communication systems.

In addition, in 5G communication systems, development for system network improvement is underway based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid frequency shift keying and quadrature amplitude modulation (FQAM) and sliding window superposition coding (SWSC), as advanced coding modulation (ACM) methods, and filter bank multi carrier (FBMC), non-orthogonal multiple access (NOMA), and sparse code multiple access (SCMA), as advanced access technologies, have been developed.

On the other hand, in order to attempt evolution from an existing 4G LTE system to a 5G system, the 3GPP that takes charge of the cellular mobile communication standards has named a new core network structure as a 5G core (5GC) and has proceeded with the standardization thereof The 5GC supports the following differentiated functions as compared with an evolved packet core (EPC) that is a network core for the existing 4G.

First, in the 5GC, a network slice function is introduced. As the 5G requirements, the 5GC is required to support various kinds of UE types and services. For example, the services may be an enhanced mobile broadband (eMBB), ultra-reliable low-latency communications (URLLC), and massive machine type communications (mMTC). Such UEs/services have different requirements for the core network. For example, in case of the eMBB service, a high data rate is required, and in case of the URLLC service, high stability and low latency are required. Technology proposed to satisfy such various service requirements is a network slice scheme.

The network slice is a method for making several logical networks by virtualizing one physical network, and each network slice instance (NSI) may have the different characteristics. Accordingly, various service requirements can be satisfied since each NSI has a network function (NF) to suit the characteristic. Through allocation of the NSI to suit the characteristic of the service demanded for each UE, several 5G services can be efficiently supported.

Second, the 5GC can facilitate the network virtualization paradigm support through separation of a mobility management function and a session management function from each other. In the existing 4G LTE, all UEs can be provided with services from the network through signaling exchange with single core equipment so called a mobility management entity (MME) that takes charge of registration, authentication, mobility management, and session management functions. However, in the 5G, if the single equipment, like the MME, supports all functions in a state where the number of UEs is explosively increased and the mobility and traffic/session characteristics that should be supported in accordance with the UE types are subdivided, scalability for adding entities by required functions may be inevitably reduced. Accordingly, in order to improve the scalability in terms of the function/implementation complexity of core equipment that takes charge of a control plane and the signaling load, various functions have been developed based on a structure for separating the mobility management function and the session management function from each other.

DISCLOSURE OF INVENTION

Technical Problem

The disclosure relates to a method and a device for controlling a high accuracy positioning system in accordance with a UE movement. In the 3GPP system, a UE is always aware of its location based on a cell or a tracking area in the 3GPP system through a modem having received a signal being broadcasted from a mobile communication base station. However, an indoor positioning technology of the high accuracy positioning technology can provide the high accuracy positioning technology only in an area where a positioning node for supporting the positioning technology is installed, for example, only in the subway or a specific building. Further, an outdoor positioning technology of the high accuracy positioning technology can provide the positioning technology only in a specific an area. For example, the technology that utilizes the network real time kinematic (RTK) can implement the high accuracy positioning technology only in an area where a base transceiver station (e.g., base station) is installed and information is provided from the installed base station. The high accuracy positioning technology can measure the location of the UE down to the more minute units, but may cause the occurrence of more power consumption in order to use the high accuracy positioning. Accordingly, in case that the high accuracy positioning technology can be utilized only in the specific area as described above, there is a need for a method for saving power consumption of a UE by controlling an operation for a high accuracy positioning system function of the UE based on location information in the 3GPP system.

Solution to Problem

According to an embodiment of the disclosure, a method, by a UE, for measuring a location in a mobile communication system may include: receiving, from a location management function (LMF) device in the mobile communication system, UE positioning performance information including a surrounding target area and a UE positioning method; receiving system information from a base station in the mobile communication system; identifying whether the UE is included in the surrounding target area based on the received positioning performance information and system information; determining a positioning method based on the received UE positioning performance information in case that the UE is located within the surrounding target area; performing positioning of the UE by the determined positioning method; and transmitting a result of the positioning to the LMF device.

According to an embodiment of the disclosure, a UE device for measuring a location in a mobile communication system may include: a memory configured to store UE positioning performance information and system information; a communication unit configured to communicate with a base station in the mobile communication system; a positioning unit configured to measure a location of the UE; and a processor, wherein the processor is configured to control to: receive, from a location management function (LMF) device in the mobile communication system, the UE positioning performance information including a surrounding target area and a UE positioning method, receive the system information from the base station in the mobile communication system, identify whether the UE is included in the surrounding target area based on the received positioning performance information and system information, determine a positioning method based on the received UE positioning performance information in case that the UE is located within the surrounding target area, perform positioning of the UE by the determined positioning method, and transmit a result of the positioning to the LMF device.

According to an embodiment of the disclosure, a method, by a location management function (LMF) device, for controlling positioning of a UE in a mobile communication system may include: receiving, from an access and mobility management function (AMF) device in the mobile communication system, a UE location determination request message, the location determination request message including a surrounding target area and positioning level information; determining a positioning method to be performed by the UE based on the received location determination request message; transmitting, to the UE, UE positioning performance information including information on the determined positioning method; receiving a response message from the UE; and transferring, to the AMF device, the response message received from the UE.

According to an embodiment of the disclosure, a location management function (LMF) device for controlling positioning of a UE in a mobile communication system may include: a memory configured to store positioning related information of the UE; a communication unit configured to communicate with the UE through a base station in the mobile communication system and to communicate with another network function device in the mobile communication system; and a processor, wherein the processor is configured to control to: receive, from an access and mobility management function (AMF) device in the wireless communication system, a UE location determination request message, the location determination request message including a surrounding target area and positioning level information, determine a positioning method to be performed by the UE based on the received location determination request message, transmit, to the UE, UE positioning performance information including information on the determined positioning method, receive a response message from the UE, and transfer, to the AMF device, the response message received from the UE.

Advantageous Effects of Invention

According to the disclosure, by operating a location information system only in case that a UE is located in a specific area in a 3GPP system in an environment in which a high accuracy location information service is provided only in the specific area, it is possible to save consumption of a power being used in a high accuracy location information system.

BRIEF DESCRIPTION OF DRAWINGS

FIG. 1 is a diagram illustrating a network architecture supporting a location service for a 5G system according to the disclosure.

FIGS. 5A and 5B are signal flowcharts of a system explaining a high accuracy positioning control method based on a UE location according to a first embodiment of the disclosure.

FIGS. 6A and 6B are signal flowcharts of a case where high accuracy UE positioning performance information is transferred to a UE through an LMC according to a second embodiment of the disclosure.

FIGS. 7A and 7B are signal flowcharts explaining a case where high accuracy UE positioning performance information is transferred to a UE through an LMF according to a third embodiment of the disclosure.

MODE FOR THE INVENTION

Figure 2:
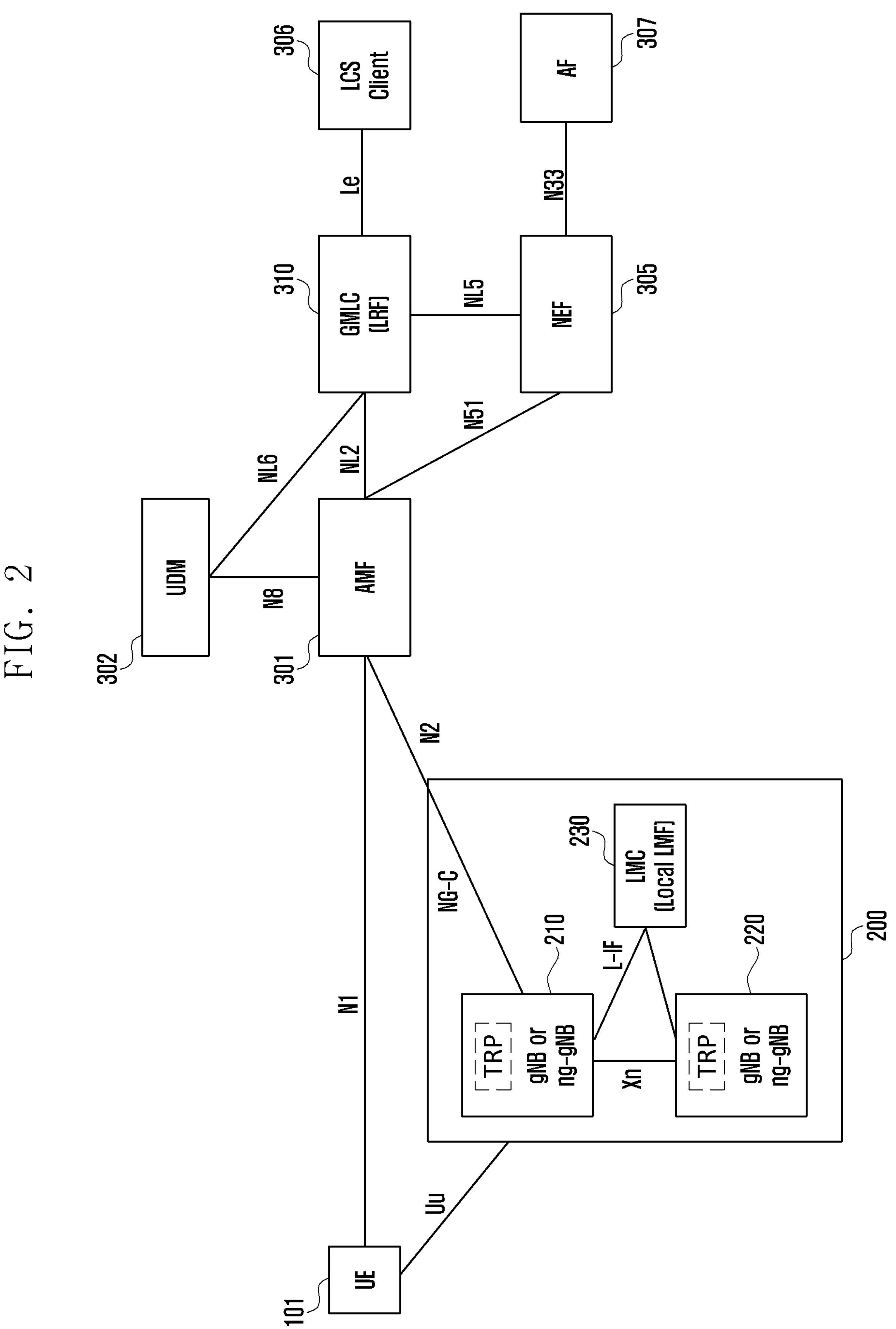
FIG. 2 is a diagram exemplifying a RAN-based location information service providing structure.

Hereinafter, embodiments of the disclosure will be described in detail with reference to the accompanying drawings. In describing the disclosure, a detailed description of related known functions or configurations will be omitted if it is determined that it obscures the disclosure unnecessarily. Further, terms to be described later are terms defined in consideration of their functions in the disclosure, but may differ depending on intentions of a user or an operator, or customs. Accordingly, they should be defined on the basis of the contents of the whole description of the disclosure. Hereinafter, a base station is the subject that performs resource allocation to a UE, and it may be at least one of eNode B, Node B, base station (BS), radio access network (RAN), access network (AN), RAN node, radio access unit, base station controller, or node on a network. A UE may include user equipment (UE), mobile station (MS), cellular phone, smart phone, computer, or multimedia system capable of performing a communication function. In the disclosure, a downlink (DL) means a radio transmission path of a signal that the base station transmits to the UE, and an uplink (UL) means a radio transmission path of a signal that the UE transmits to the base station. Further, although an embodiment of the disclosure will be described as an example of a 5G system, it may also be applied even to other communication systems having the similar technical backgrounds or channel types, for example, an LTE or LTE-A system. Further, it will be apparent to those skilled in the art that the embodiment of the disclosure can be applied even to other systems having the similar technical backgrounds or channel types. Further, the embodiment of the disclosure can be applied even to other communication systems through slight modifications thereof in the range that does not greatly deviate from the scope of the disclosure by the judgment of those skilled in the art to which the disclosure pertains.

Figure 1:
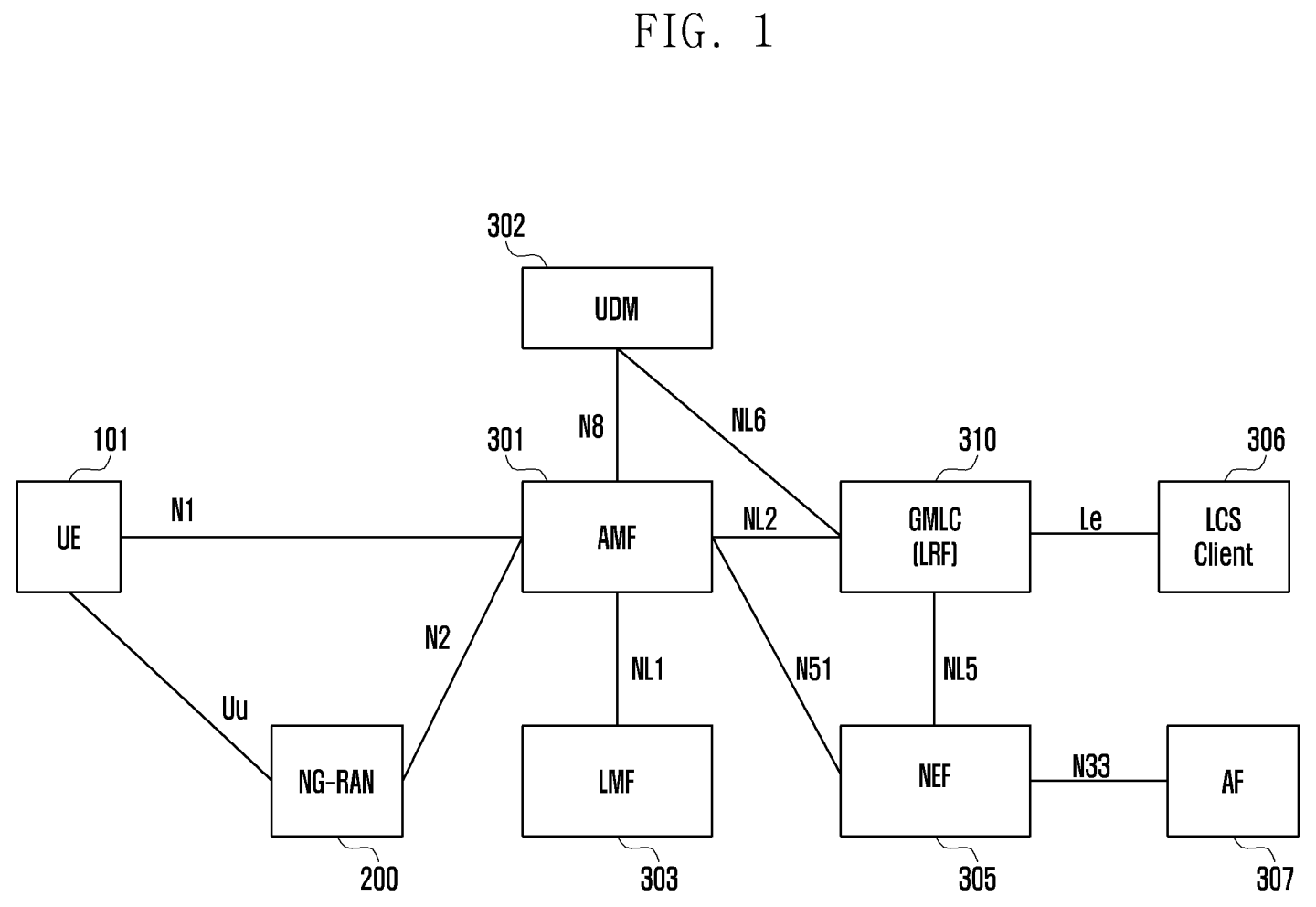

FIG. 1 is a diagram illustrating a network architecture supporting a location service for a 5G system according to the disclosure.

FIG. 1 exemplifies not only a network structure (or network architecture) of a 5G system but also an interface between network entities.

With reference to FIG. 1, a network structure of a 5G system may include user equipment (UE) 101, radio access network ((R)AN) 200, a user plane function (UPF) device (not illustrated in FIG. 1), data network (DN) (not illustrated in FIG. 1), an authentication server function (AUSF) device (not illustrated in FIG. 1), an access and mobility management function (AMF) device 301, a session management function (SMF) device (not illustrated in FIG. 1), a network slice selection function (NSSF) device (not illustrated in FIG. 1), a network exposure function (NEF) device 305, a network repository function (NRF) device (not illustrated in FIG. 1), a policy control function (PCF) device (not illustrated in FIG. 1), a unified data management (UDM) device 302, an application function (AF) device 307, a gateway mobile location center (GMLC) device 310, a location management function (LMF) device 303, and a location service client (LCS) or LCS client 306.

Each function or function device exemplified in FIG. 1 may become one network node. One network node may take a physically and/or logically independent form. As another example, physically and/or logically two or more nodes may constitute one network node. Further, each network function may be implemented as a specific device. As another example, each network function may be implemented as a form in which a device and software are combined with each other. As still another example, each network function may be implemented by software in a device on a collective specific network. Hereinafter, each network function may be expressed like "~function device" or may be expressed as a network function. In the following description, each network function may be equally understood as a network function device in all.

According to an embodiment of the disclosure, the UE 101 may mean a terminal. The AMF 301 is a network function that manages mobility of the UE 101. The SMF (not illustrated in FIG. 1) is a network function device that manages connection of a packet data network being provided to the UE 101. This connection is called a protocol data unit (PDU) session. The PCF (not illustrated in FIG. 1) is a network function that applies a service policy of a mobile communication service provider, a billing policy, and a policy on a PDU session to the UE 101. The UDM 302 is an abbreviation of a unified data management device, and is a network function device that stores and manages information on a subscriber. The NEF 305 can access information for managing the UE in the 5G network, and may serve to transfer information on the UE 101 to specific network function (NF) devices 307 of a 5G core network or to report the information on the UE 101 to outside through connection with the corresponding NF devices 307, such as subscription to a mobility management event of the corresponding UE, subscription to a session management event of the corresponding UE, request for session-related information, configuration of charging information of the corresponding UE, and request for a PDU session policy change for the corresponding UE. The 5G-RAN 200 means a base station that can access the UE 101 through a wireless communication technology. In FIG. 1, it is illustrated as an NG-RAN 200. The UPF (not illustrated in FIG. 1) is an abbreviation of a user plane function device, and may serve as a gateway that transfers a packet being transmitted and received by the UE 101. The UPF is connected to the data network (DN), and may serve to transfer a data packet generated in the 5G system to an external data network. For example, the UPF may be connected to the data network being connected to the Internet, and may route the data packet being sent by the UE to the Internet.

Meanwhile, the 5G system may provide a high accuracy low-latency location information service.

In FIG. 1, the LMF 303 may be a network function device that takes charge of the overall management of resources required to provide location information of the UE 101 registered in the 5G. The LMF 303 may serve to calculate the location information of the UE 101, or to finally identify and report the location of the UE 101 to the GMLC 310.

The LMF 303 receives a request for location information of a target UE from the AMF 301 through an Nlmf interface. The LMF 303 exchanges location information necessary for a UE-based positioning method or a UE-assisted positioning method, and such a protocol is called an LTE positioning protocol (LPP). In the disclosure, the protocol that is called the LPP is a protocol that is used for the UE-based positioning method or the UE-assisted positioning method between the UE and a location information positioning server (in the disclosure, LMF 303 or LMC (not illustrated in FIG. 1)). The LPP protocol is not the protocol that is necessarily limited to the LTE, and may be used even in the NR. The LMF 303 determines the positioning result on geographical coordinates described in the technical specification TS 23.032. The positioning result that is determined by the LMF 303 may include a UE speed. Further, the LMF 303 may perform the following functions.

(1) The LMF 303 may provide a location information service in accordance with a request for UE location information on the target UE 101 from the serving AMF 301.

(2) The LMF 303 may provide a location information service for a request that is triggered periodically or according to the UE location for the target UE 101 from the serving AMF 301.

(3) The LMF 303 may determine a positioning method in accordance with the capability of the UE 101 and a service provider network, a service quality, and an LCS client type.

(4) The LMF 303 may report UE positioning information triggered periodically or according to the UE location for the target UE 101 to the GMLC 310.

(5) The LMF 303 may cancel the UE positioning information report triggered periodically or according to the UE location for the target UE 101.

(6) The LMF 303 may provide auxiliary data for providing location information being broadcasted to the UE 101 through the NG-RAN 200.

In FIG. 1, the GMLC 310 may provide a necessary function for providing a location service. One or more GMLCs 310 may exist in one service provider. One GMLC 310 may be a first node through which an external LCS client accesses the service provider network. The AF 307 and the NF 307 in the 5G core network, which accesses the GMLC 310, may directly access the GMLC 310, or may access the GMLC 310 through the NEF 305. The GMLC 310 may request routing information and personal information of the target UE 101 from the UDM 302 through a Nudm interface. After identifying authorities of the external LCS client 306 and the AF 307 and verifying the personal information of the target UE 101, the GMLC 310 may forward the location information request to the serving AMF 301 through a Namf interface. During roaming of the UE 101, the GMLC 310 forwards the location information request to a PLMN of another service provider network, and may perform identification of the personal information configuration of the UE 101.

Before transmission of the result of location positioning of the target UE 101, the personal information configuration of the UE 101 should be identified, and the identification of the personal information configuration should always be performed in a home service provider network of the UE 101. A visited GMLC (VGMLC) (reference numeral 312 of FIGS. 5A and 5B and FIGS. 7A and 7B) may become the GMLC that exists in the serving service provider network of the target UE 101.

A home HGMLC (reference numeral 311 of FIGS. 5A and 5B and FIGS. 7A and 7B) may perform identification of the personal information of the target UE 101 for the GMLC existing in the home service provider of the target UE 101.

FIG. 2 is a diagram exemplifying a RAN-based location information service providing structure according to an embodiment of the disclosure.

FIG. 2 shows a network constitution that is different from that of FIG. 1 in which a 5G system provides a location information service.

In FIG. 1, the LMF 303 that performs the function of measuring the location information has a constitution being connected to the AMF 301 through the interface in the 5G core network, whereas in FIG. 2, a location management component (LMC) 230 performs the function of measuring the location information of the UE 101, and the LMC 230 may be located in the RAN 200. The LMC 230 of FIG. 2 may perform the function that is provided by the LMF 303 as described above with reference to FIG. 1. However, the LMC 230 exists in the NG-RAN 200, and the LMC 230 may be connected to the gNB or ng-gNB 210 or 220 through an L-IF. In FIG. 2, the UE 101, GMLC 310, UDM 302, LCS client 306, AF 307, and NEF 305 may perform the same functions as the functions as described above with reference to FIG. 1. However, in case that the GMLC 310 receives the location information request, the GMLC 310 may transfer the location information request to the AMF 301, and the AMF 301 may transfer the location information request to the NG-RAN 200 through an N2 reference point. The gNB (or ng-gNB) 210 may transfer the received location information request to the LMC 230 through an L-IF.

The LMC 230 is a network function that takes charge of a general management of resources necessary to provide the location information of the UE 101. The LMC 230 may play a role of calculating the location information of the UE 101, or finally identifying and reporting the location of the UE 101 to the GMLC 310.

The LMC 230 may receive the request for the location information of the target UE 101 having been transferred to the NG-RAN 200 through the N2 reference point from the AMF 301. In case that the LMC 230 exists in the NG-RAN 200 as a separate NF 307 as illustrated in FIG. 2, the LMC 230 may be connected to the gNB 210 through the L-IF interface. The gNB 210 transfers the location information request having been received from the AMF 301 through the N2 reference to the LMC 230. The LMC 230 may receive the request for the location information forwarded from the AMF 301 through the gNB 210. The LMC 230 may perform the function in the gNB or ng-gNB, and in such a case, the L-IF exists within the gNB or ng-gNB, and thus is not exposed to outside.

The LMC 230 exchanges the location information necessary for the UE-based positioning method or the UE-assisted positioning method, and such a protocol is called an LPP. In the disclosure, the protocol that is called the LPP is the protocol being used for the UE-based positioning method or the UE-assisted positioning method between the UE 101 and a location information positioning server (in the disclosure, LMF 303 or LMC 230). The LPP protocol is not the protocol that is necessarily limited to the LTE, but may be used even in the NR. The LMF 303 determines the positioning result on geographical coordinates described in the technical specification TS 23.032. The positioning result that is determined by the LMC 230 may include a UE speed. Further, the LMC 230 may perform the following functions.

(1) The LMC 230 receives a location information service in accordance with a request for UE location information on the target UE 101 from the serving AMF 301. The LMC 230 receives the request for the location information through the gNB and through the L-IF.

(2) The LMC 230 receives the request for the location information for the request that is triggered periodically or according to the UE location for the target UE 101 from the serving AMF 301. The LMC 230 receives the request for the location information through the gNB and through the L-IF.

(3) The LMC 230 determines a positioning method in accordance with the capability of the UE 101 and a service provider network, a service quality, and an LCS client type.

(4) The LMC 230 reports the UE positioning information triggered periodically or according to the UE location for the target UE 101 to the GMLC 310.

(5) The LMC 230 cancels the UE positioning information report triggered periodically or according to the UE location for the target UE 101.

(6) The LMC 230 may provide auxiliary data for providing the location information being broadcasted to the UE 101 through the NG-RAN 200.

Figure 3:
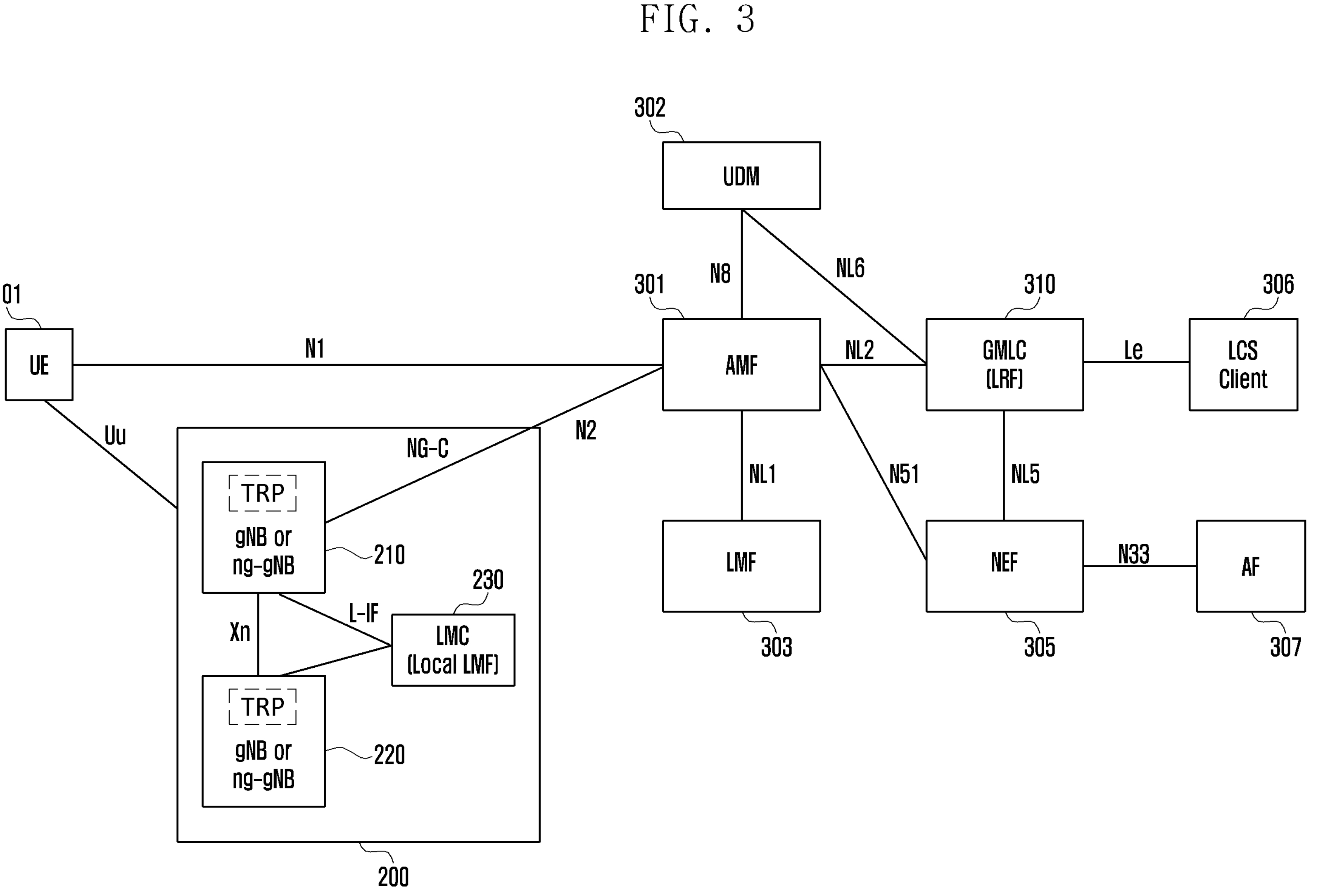
FIG. 3 is a diagram exemplifying a structure in which both LMC and LMF exist in one serving provider.

FIG. 3 is a diagram exemplifying a structure in which both LMC and LMF exist in one serving provider according to various embodiments of the disclosure.

Explanation of individual network functions is equal to the functions as described above with reference to FIGS. 1 and 2. In the structure exemplified in FIG. 3, the AMF 301 may be aware of whether the LMC 230 and the LMF 303 coexist, and when receiving the request for the location information, the AMF 301 may determine whether to use the location information service of the LMC 230 or the location information service of the LMF 303 in consideration of whether to provide the protocol and the function being provided to the UE 101, the accuracy level and the positioning method being provided by the LMC 230 and the LMF 303, and the service quality of the request for the location information included in the location information request message, the service type and service identifier, location information service identifier, location information response time, and required accuracy of the location information.

Figure 4:
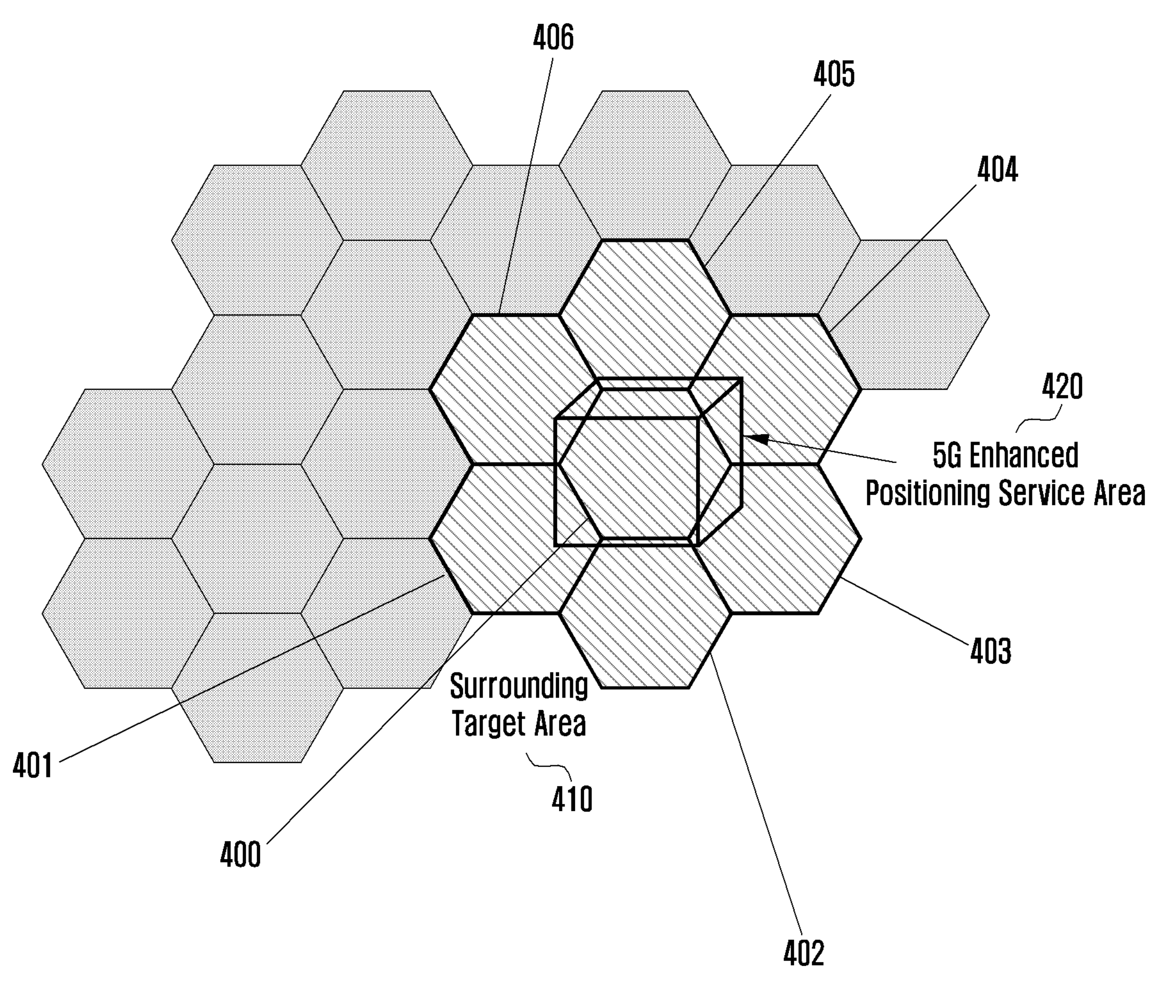
FIG. 4 is an exemplary diagram explaining a surrounding target area and a 5G positioning service area according to the disclosure.

FIG. 4 is an exemplary diagram explaining a surrounding target area and a 5G positioning service area according to the disclosure.

With reference to FIG. 4, among a plurality of cells, a surrounding target area 410, a 5G positioning service area, and a 5G enhanced positioning service area 420 are exemplified. FIG. 4 is merely exemplary for the respective areas, and is not intended to define areas that are explained in the disclosure. The respective areas are described as follows.

(1) 5G Positioning Service Area

The 5G positioning service area is an area in which a positioning service is provided through network equipment located in a zone where the 5G service is provided and the positioning technology. For example, the 5G positioning service area may be an area in which a national 5G network service of the service provider is provided or an area in which a global navigation satellite system (GNSS) positioning service is provided. Such a service area may include all of an indoor positioning providing area and an outdoor positioning providing area. In FIG. 4, all areas indicated as hexagons may be cell-based positioning service providing zones in which the 5G network service is provided. That is, the service area includes all cells indicated as hexagons. In FIG. 4, the area indicated as the hexagon is an area in which the location of the mobile UE, which can be discriminated as a cell or a tracking area of the 3GPP system, can be specified.

(2) 5G Enhanced Positioning Service Area 420

The 5G enhanced positioning service area 420 is a partial area of the 5G positioning service area, and is included in the 5G positioning service area. The 5G enhanced positioning service area 420 may be provided by additional equipment in addition to the equipment for providing the 5G network service or may be provided by applying a specific positioning technology that is necessary to enhance the positioning service. Examples of the 5G enhanced positioning service area 420 may be a factory, a dense urban area, the surrounding of a road or a railroad track, and a tunnel, and may include all of indoor and outdoor environments. In FIG. 4, the 5G enhanced positioning area 420 is expressed as a hexahedron. Actually, the 5G enhanced positioning area 420 may be an area that includes a target cell 400.

(3) Surrounding Target Area 410

The surrounding target area 410 is an area that includes the 5G enhanced positioning area 420, and is the minimum area that includes the 5G enhanced positioning area 420 in which location tracking is possible by using a low-power positioning method, such as the cell-based positioning method, in the 5G system. Accordingly, the surrounding target area 410 may include surrounding cells 401, 402, 403, 404, 405, and 406 of the 5G enhanced positioning area 420. This area may include the 5G enhanced positioning area 420 in which the high accuracy positioning method is available. If the high accuracy positioning method is required in the 5G enhanced positioning area 420, the 5G system may activate the high accuracy positioning system in case that the target UE 101 is within the surrounding target area 410. The surrounding target area 410 may be mapped as the area of interest that can be discriminated by a cell list, a tracking area, or an NG-RAN node identifier list.

The universal geographic area description (hereinafter, GAD) among the geographic area expressions is a geographic area description method. The geographic location description method can express the shape and the speed.

In the disclosure, the shape of the geographic location description may be expressed as one or two or more of the following methods.

Figure 12A:
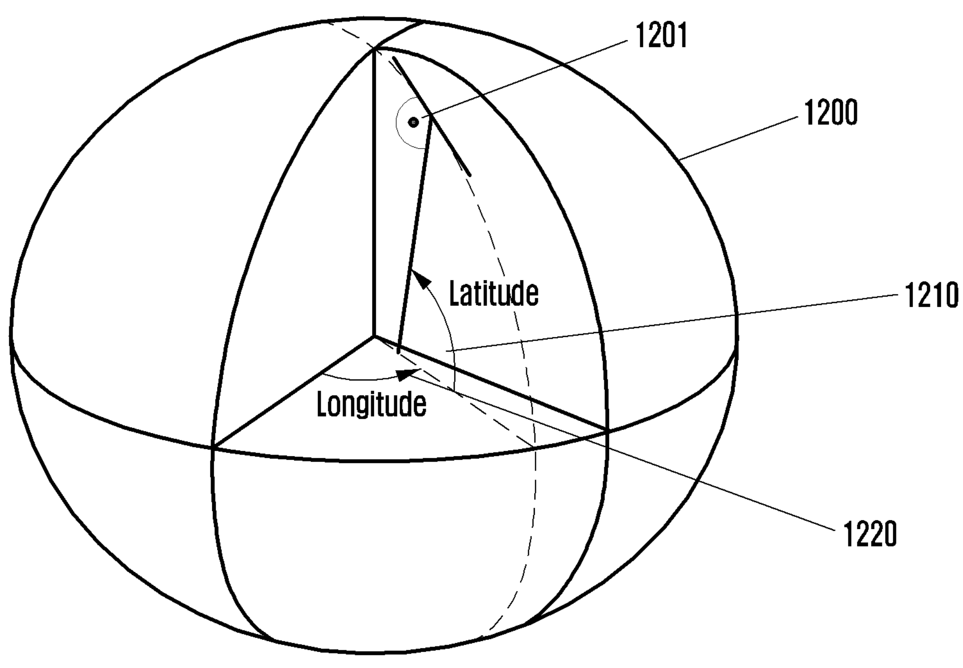
FIGS. 12A to 12C are diagrams exemplifying various methods for representing a location of a UE according to the disclosure.
Figure 12B:
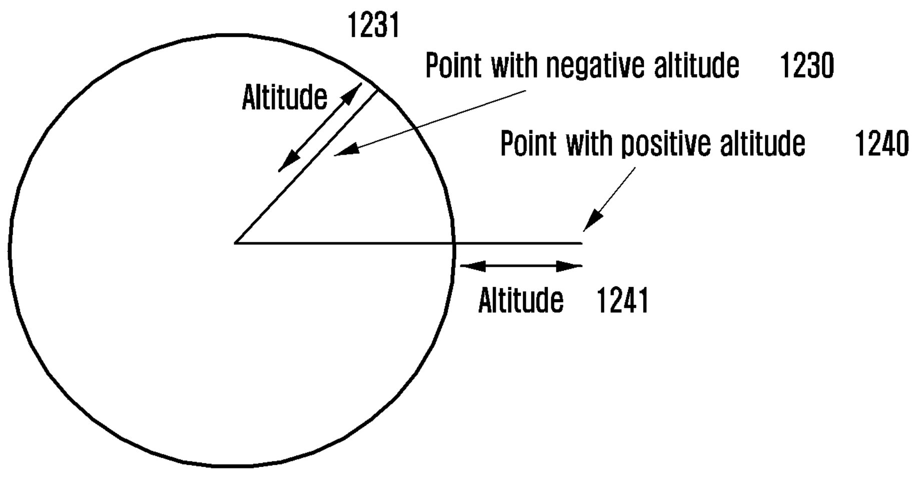
Figure 12C:
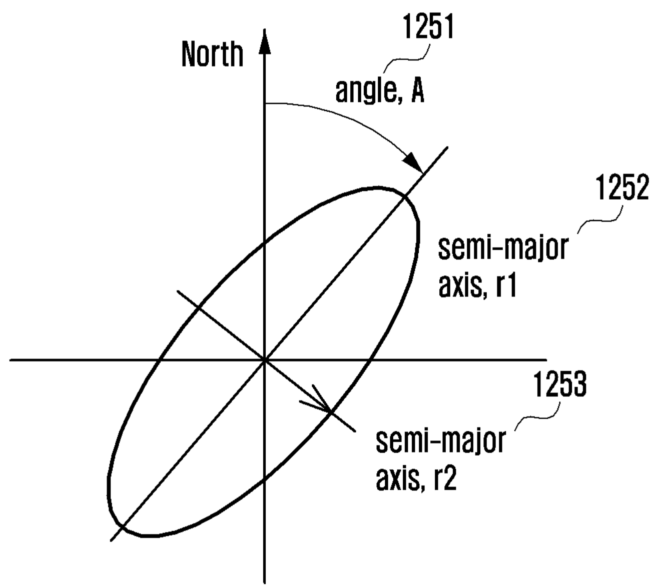

1) Ellipsoid point
2) Ellipsoid with uncertainty circle
3) Ellipsoid with uncertainty ellipse
4) Polygon
5) Ellipsoid with altitude
6) Ellipsoid with altitude and uncertainty ellipse
7) Ellipsoid arc
8) High accuracy ellipsoid point with uncertainty ellipse
9) High accuracy ellipsoid point with altitude and uncertainty ellipse FIGS. 12A to 12C are diagrams exemplifying various methods for representing a location of a UE according to the disclosure.

In FIG. 12A, an ellipsoid point 1201 on an ellipsoid 1200 may be a description method that is used in the World Geodetic System 1984 (WGS84) standard system being used in a global positioning system (GPS). The ellipsoid point 1201 of the ellipsoid 1200 is a description method that can describe the location of the point on the surface of the global ellipsoid 1200 with inclusion of latitude 1210 and longitude 1220.

Next, in FIG. 12B, the ellipsoid with altitude is a description method that further includes information on altitudes 1230, 1231, 1240, and 1241 together with the location of the ellipsoid point 1201 of the ellipsoid 1200 as described above. For example, in case of the location in a direction 1231 that is lower than a specific reference point on the ground surface or the surface of the water, the coordinates may indicate the location having a negative value 1230. In contrast, in case of the location in a direction 1241 that is higher than the specific reference point on the ground surface or the surface of the water, the coordinates may indicate the location having a positive value 1240.

FIG. 12C is a diagram exemplifying an ellipse having uncertainty.

In FIG. 12C, it is possible to describe an angle A 1251 in the north direction, a semi-major axis r1 1252, and a semi-minor axis r2 1253. Further, in FIG. 12C, points of the two location description methods as described above may be used together.

The speed of the geometric location description method may be described as a horizontal speed and a vertical speed. The horizontal speed may be described as the direction of the target and the speed level, and the vertical speed may be described as the direction of the target and the speed level.

First Embodiment

Figure 5A:
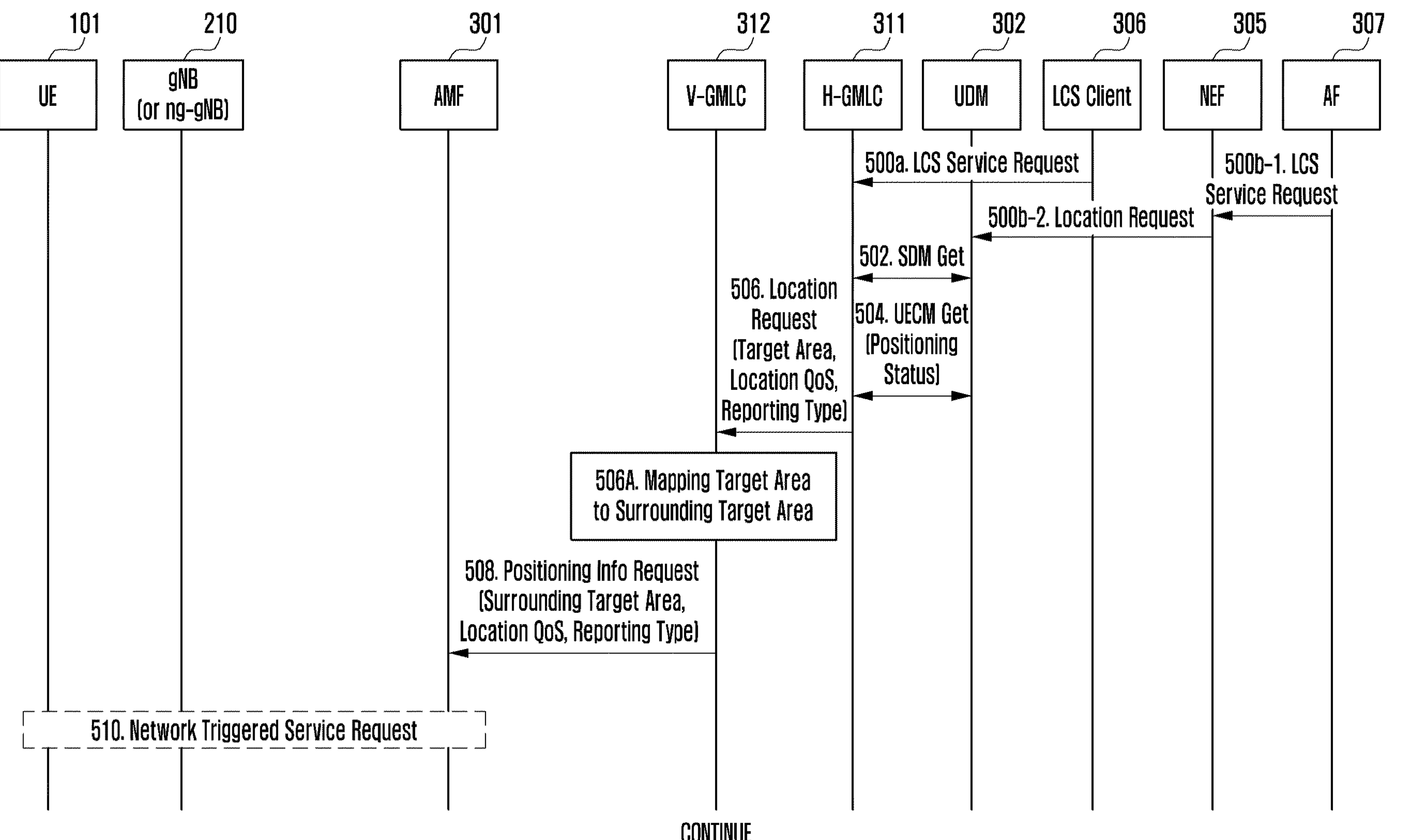
Figure 5B:
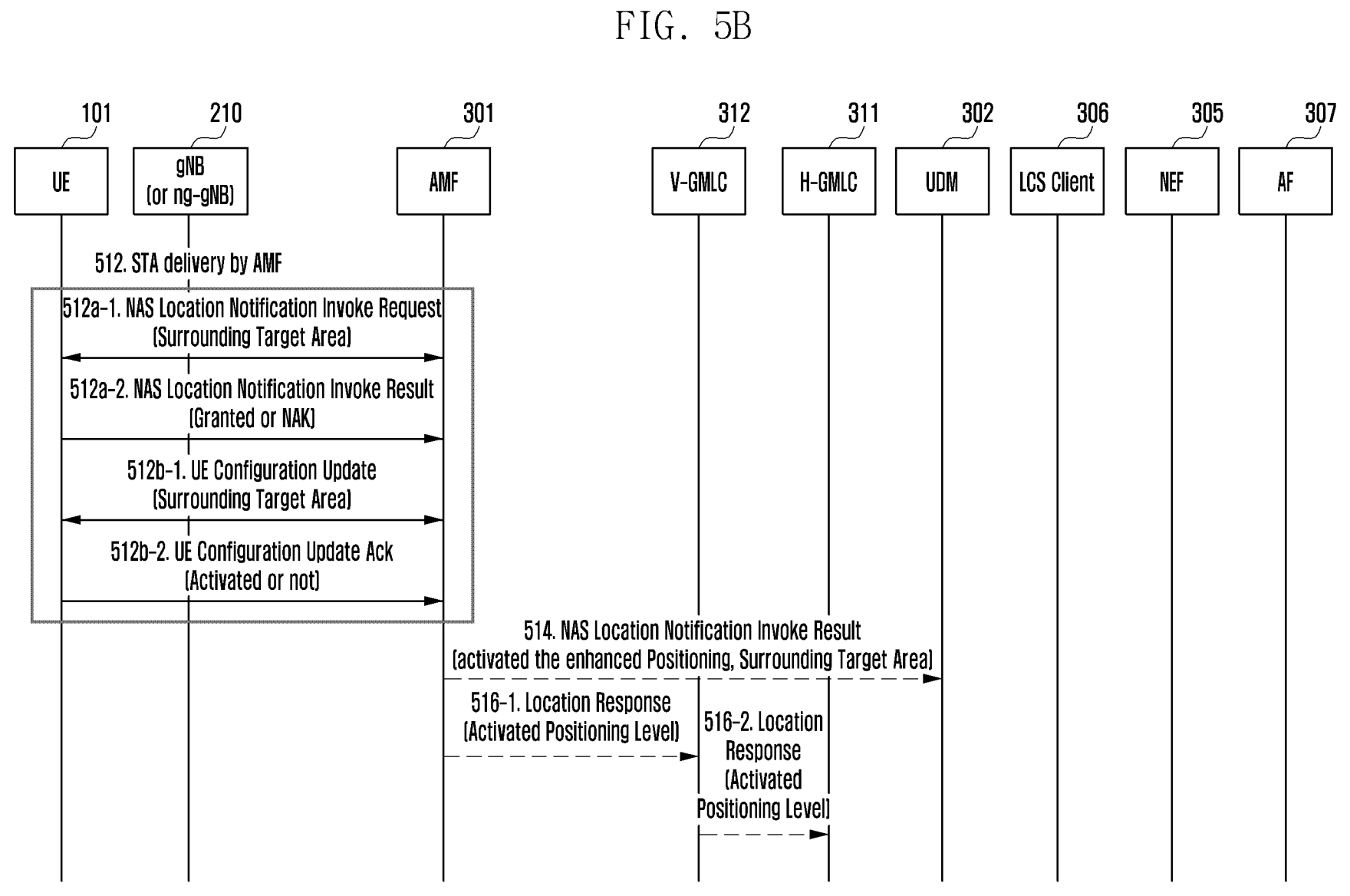

FIGS. 5A and 5B are signal flowcharts of a system explaining a high accuracy positioning control method based on a UE location according to a first embodiment of the disclosure.

In the following description, the signal flow in FIGS. 5A and 5B may be a continuous flow. That is, after the signal flow of FIG. 5A, the signal flow of FIG. 5B may continue.

With reference to FIG. 5A, in procedure 500, the AF 307 or the LCS client 306 may transfer the location information service request to the H-GMLC 311. The location information service request message may include at least one or two or more of the following pieces of information.

(1) Target UE identifier: UE identifier or UE group identifier requesting location information (2) Requester's identifier: Identifier for discriminating an LCS client or AF having requested (3) Request transaction delimiter: Delimiter for the location information request (4) Information on location information service quality (Location QoS): This is information representing the quality of a service for the location information request. This information may include location accuracy and service response time information. Further, this information may include the type of the location information service or the delimiter of the location information service. The location information quality information may be a location service quality index corresponding to the location information accuracy and the service response time. The location service quality index may previously (in advance) be stored in the H-GMLC 311 by itself, or the location service quality index may be received from the external NF 307, for example, from the UDM 302 or the PCF (not illustrated in FIGS. 5A and 5B). The location service quality index may be exemplified as in Table 1 below.

TABLE 1

| Location information service quality index | Absolute location (A) Relative location (B) | Accuracy Horizontal direction | Accuracy Vertical direction | Service response time | Indoor/outdoor |
|---|---|---|---|---|---|
| 1 | A | 10 m | 3 m | 1 s | Outdoor/indoor |
| 2 | A | 3 m | 3 m | 1 s | Outdoor/indoor |
| 3 | A | 1 m | 2 m | 1 s | Outdoor/indoor |
| 4 | A | 1 m | 2 m | 15 ms | Outdoor/indoor |
| 5 | A | 0.3 m | 2 m | 1 s | Outdoor/indoor |
| 6 | A | 0.3 m | 2 m | 10 ms | Outdoor |
| 7 | A | 0.2 m | 0.2 m | 1 s | Outdoor/indoor |

High accuracy positioning request information: This is an indicator that explicitly indicates the high accuracy positioning request. The high accuracy positioning request information may include at least one or two or more of the following pieces of information.

(1) High accuracy positioning request indicator: This is an indicator that explicitly indicates whether the positioning is the high accuracy positioning or not.

(2) High accuracy positioning method: This is an indicator that explicitly indicates the high accuracy positioning method, and the corresponding information may include a high accuracy GNSS (e.g., real time kinematic) positioning method, or a Wi-Fi or BT positioning method, or a positioning method utilizing UWB.

(3) High accuracy positioning support type: This may indicate the positioning support type that is discriminated to an indoor positioning method or an outdoor positioning method. The indoor positioning method represents the type that is utilized for indoor positioning, such as a beacon method, Wi-Fi method, sound magnetic, camera utilization, UWB, or RFID. The outdoor positioning method represents the type that is utilized for outdoor positioning, such as GNSS, A-GNSS, or RTK.

(4) 5G enhanced positioning service area: This is an area where the high accuracy positioning service is provided. This may be the area as described above with reference to FIG. 4. Information representing such an area may be the following pieces of information.

1) 5G enhanced positioning service area index: This is an index indicating the 5G enhanced positioning service area.

2) 5G enhanced positioning service area identification number: This may be information, such as a detailed number that provides the 5G enhanced positioning service area, building name, subway station name, and building name/number.

Location information service information: The type of the location information service or the delimiter of the location information service may be preconfigured in the AMF 301. The type of the location information service or the delimiter of the location information service may be received from a device that is stored in the UDM 302 being the NF 307 outside the AMF 301 or the PCF (not illustrated in FIG. 1). The AMF 301 may extract the location information service quality information that is mapped onto the type of the location information service or the delimiter of the location information service configured in the AMF 301. The type of the location information service may be used for the AMF 301 or the LMC 230 to determine the positioning method being used to determine the location of the UE 101.

3) GAD information of the 5G enhanced positioning service: This may include information expressed as a list of polygonal coordinates representing an area with a specific coordinate indicated by altitude/longitude like a GPS coordinate or a list of coordinates.

4) Characteristic information of the 5G enhanced positioning service area: This may include characteristic information of an area in which a service is provided. The characteristic information may represent the kind of places where a lot of people gather, such as a building, outdoor sports arena, indoor sports arena, concert hall, subway, department store, hotel, and plaza.

In procedure 502, the H-GMLC 311 may identify subscription information through the UDM 302 in order to identify whether it is possible to provide the location information of the target UE 101 included in the location information request.

In procedure 504, in order to know information on the AMF 301 being served by the identifier of the UE 101 included in the location information request, the H-GMLC 311 may request the information from the UDM 302, and may receive the identifier of the AMF 301 serving the target UE 101.

In procedure 506, during roaming of the corresponding UE 101, the H-GMLC 311 may request the location information from the V-GMLC 312, and may transfer information including the identifier of the target UE 101 and the identifier of the AMF 301 to the V-GMLC 312. The V-GMLC 312 may receive a target area (or 5G enhanced positioning service area information) included in the location information request. The mapped surrounding target area information may be changed from the received 5G enhanced positioning service area information.

The surrounding target area information may be preconfigured for the target area in which the high accuracy positioning service being provided from the H-GMLC 311 is provided. Alternatively, the surrounding target area information may be dynamically designated from the information included in the received request message. In case that the surrounding target area information is dynamically designated from the location information request, the surrounding target area can be dynamically extracted through the following procedures.

1) It is possible to change the target area that is expressed in various expression methods to a polygon or a polyhedron composed of GAD-shaped ellipsoid points (e.g., expressed as a hexahedron of FIG. 4).
2) It is possible to select a unit for area designation based on a cell, a base station, or a traffic area.
3) It is possible to determine the minimum area including polygons or polyhedrons in advance in accordance with the unit of the determined area. The area determined as above is called a surrounding target area configuration area (e.g., it may be the surrounding target area expressed in FIG. 4).

The surrounding target area information may be a cell list, TA list, area of interest, and presence reporting area. The V-GMLC 312 may transmit, to the AMF 301, an indicator indicating that the corresponding area is the 5G enhanced service area together with the surrounding target area information.

In procedure 508, the V-GMLC 312 may transfer, to the AMF 301, both the information included in the location information request message received by the V-GMLC 312 and the surrounding target area mapped in the V-GMLC 312. In the disclosure, in case of the roaming, the V-GMLC 312 and the H-GMLC 311 are called a visited GMLC 312 existing in a visited service provider network and a home GLMC 311 existing in a home service provider network, respectively. In case of non-roaming, the H-GMLC 311 and the V-GMLC 312 may be the same network entity.

In procedure 510, in case that the UE 101 is in an idle state, the AMF 301 may perform a network trigger service request procedure.

In procedure 512, the AMF 301 may identify the location of the current UE 101 in the 3GPP system, and may discriminate (identify) whether a surrounding target area 410 is included in a registration area of the current UE 101. If so (if the surrounding target area 410 is included), the AMF 301 may transfer the high accuracy UE positioning performance information to the UE 101. The high accuracy UE positioning performance information may include at least one or two or more of the following pieces of information.

(1) High accuracy surrounding target area: This may include the surrounding target area information of the V-GMLC 310 or an intersection area between the surrounding target area and the registration area of the UE 101.
(2) High accuracy positioning method index: This may include indexes representing assisted GNSS providing high accuracy positioning or assisted GNSS with real time kinematic (RTK), UWB, 3GPP cell-based OTDOA, Wi-Fi index, and BT.
(3) High accuracy positioning support environment information: Indoor positioning or outdoor positioning
(4) High accuracy positioning type: This may include relative positioning or absolute positioning, or 3D positioning information including 2D information or a distance from the ground of the target UE 101.
(5) High accuracy positioning level: This may transfer a value for expressing the high accuracy positioning level. For example, the high accuracy positioning level may be exemplified as in Table 2 below.

TABLE 2

| High accuracy positioning level | Accuracy |
|---|---|
| 1 | <10 m |
| 2 | <3 m |
| 3 | <2 m |
| 4 | <0.3 m |
| 5 | <0.2 m |
| 6 | <10 m |

In procedure 512, a NAS message that the AMF 301 sends to the UE 101 may be additionally transferred to a **512*a*-1 NAS location notification invoke request. Alternatively, as in 512*b*-1**, the NAS message may be included in a UE configuration update request message to be transferred.

The UE 101 having received the above-described high accuracy positioning information transferred through procedure **512*a*-1 or 512*b*-1 may determine whether to be able to perform the requested positioning according to the high accuracy positioning information. In case that the UE 101 is able to perform the requested positioning through interpretation of the requested information, the UE 101 may send a response in that the UE 101 can perform the requested positioning. The UE 101 may make information representing which positioning method is being used in a state where the positioning method of the current UE 101 is in operation be included in the response message to be transferred. In case that the UE 101 is unable to perform the requested positioning through interpretation of the requested information, the UE 101 may transfer a reason for positioning performance failure together with the result that the UE 101** is unable to perform the requested positioning. The reason of the positioning performance failure may include at least one or two or more of the following contents.

(1) The required positioning method is unable to be provided, and a function for providing the requested positioning method is not mounted.
(2) There is not the positioning function that can satisfy the required accuracy.
(3) The user does not agree with (the user rejects) the required positioning method or accuracy.

(4) The positioning method that can satisfy the required accuracy is rejected to be used by the user preference and configuration.
(5) The signal coverage is not caught in the positioning method that satisfies the required accuracy.
(6) The high accuracy positioning method is unable to be used due to a low power mode of the UE 101.
(7) The required 5G enhanced area is not found.
(8) An error occurs in resource allocation for the requested positioning technology utilization.

The AMF 301 may receive a response from the UE 101, and in case of a successful response, the AMF 301 may store, in the AMF 301, positioning state information and high accuracy positioning information transferred together with the response message in procedure 515. Alternatively, the AMF 301 may store the positioning state information of the UE 101 in the context of the UE 101 by transferring the positioning state information to the UDM 302. Thereafter, in case that the UE 101 moves from the current AMF 301 and receives a request for context of the UE 101 from a newly accessed AMF 301, the stored positioning state information may be transferred to the newly accessed AMF 301. Alternatively, after the UE 101 is released from the RRC and moves in an idle state, the state stored in a NAS connection restoration procedure is restored, and in case that the location information state of the UE 101 does not coincide with the location information state of the AMF 301, the AMF 301 may retransmit the state stored in the UE context and the high accuracy positioning information to the UE 101 by performing the procedure 512.

In procedures 516-1 and 516-2, the AMF 301 may transfer the response message received from the UE 101 to the H-GMLC 311 through the V-GMLC 312. The H-GMLC 311 may retransfer the response message to the LLC client 306 or the NEF 305 having requested the location information service (not illustrated in FIGS. 5A and 5B). The NEF 305 may also transfer the response to the location information to the AF 307 (not illustrated in FIGS. 5A and 5B).

In the present embodiment, a case in which the location information request is requested from the AF 307 or the LCS client 306 has been described. However, the location information request may also be transferred from the UE 101 or the RAN 200.

In case that the location information is requested from the UE 101 or the RAN 200, the location information request may be transferred to the AMF 301. In this case, the AMF 301, in procedure 500, may receive the location information request received by the H-GMLC 311 from the UE 101 or the RAN 200. The AMF 301 may receive the location information request described in procedure 500 from the UE 101 or the RAN 200, and may perform the same procedure as that performed by the V-GMLC 312 in procedure 508. For example, the 5G enhanced location information included in the information request may be changed to the high accuracy surrounding information request. Thereafter, the AMF 301 may perform procedures subsequent to the procedure 510.

Second Embodiment

Figure 6B:
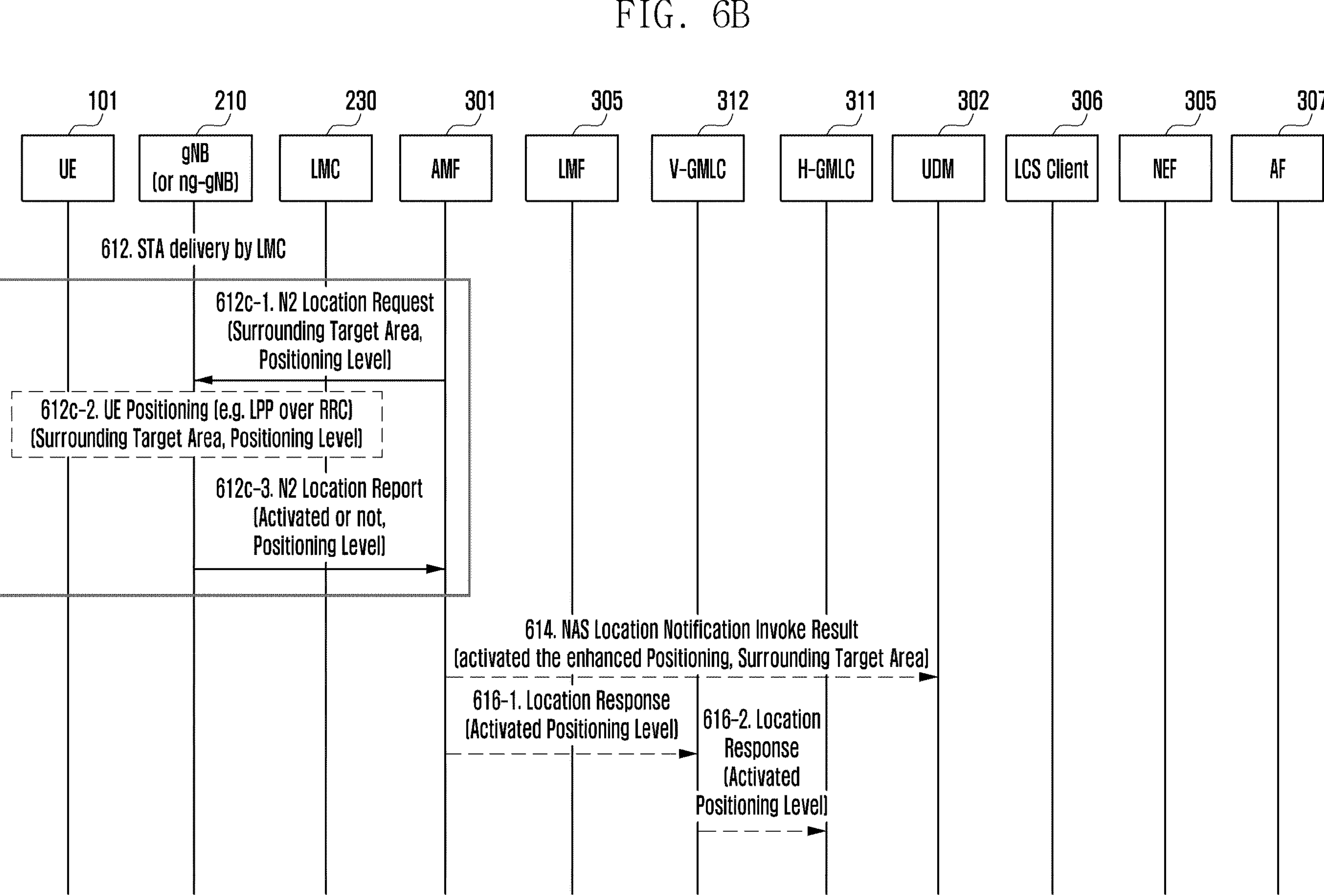

FIGS. 6A and 6B are signal flowcharts of a case where high accuracy UE positioning performance information is transferred to a UE through an LMC according to a second embodiment of the disclosure.

The signal flow in FIGS. 6A and 6B may be a continuous flow as described above with reference to FIGS. 5A and 5B. That is, after the signal flow of FIG. 6A, the signal flow of FIG. 6B may continue.

In FIG. 6A, procedures 600 to 610 are the same as the procedures 500 to 512 as described above in the first embodiment. Accordingly, explanation of the same parts will be omitted.

In procedure 612 of FIG. 6B, the AMF 301 may select the LMC 230 that can provide the corresponding high accuracy positioning through the location information request and the surrounding target area information received from the (V-) GMLC 312. The AMF 301 identifies whether the previously allocated LMC 230 is present in the target UE 101 for requesting the location information. In case that the previously allocated LMC 230 is present for the target UE 101, the AMF 301 may determine whether the LMC 230 allocated for the target UE 101 satisfies the service quality that is included in the location information request received in procedure 618. If it is determined that the allocated LMC 230 can provide the high accuracy location information service that satisfies the requested service quality, the AMF 301 may transfer the location information service request to the pre-allocated LMC 230 through the RAN 200. If it is determined that the LMC 230 allocated to the target UE 101 cannot satisfy the requested location information service quality, the AMF 301 may reallocate the LMC for the target UE 101, and may transfer toe location information request information and the surrounding target area information received in procedure 612*c*-1 to the LMC through the RAN. In case that the AMF 301 newly designates the LMC, the AMF 301 may transfer request information for a periodic location information service for the existing target UE 101 together. The AMF 301 may transfer, to the RAN 200, the location information request from the LMC 230, surrounding target area, and the high accuracy positioning UE performance information together with the allocated or reallocated LMC identifier.

If the RAN 200 receives, from the AMF 301, the location information request from the LMC 230, the surrounding target area, the high accuracy positioning UE performance information, and the LMC identifier in procedure 612*c*-1, The RAN node, in procedure 612*c*-2, may select the LMC 230 through the LMC identifier, and may forward, to the LMC 230, the location information request from the LMC 230 received from the AMD 301, the surrounding target area, and the high accuracy positioning UE performance information.

Alternatively, the RAN node 210 may select and transfer the proper LMC 230 through the location information request from the LMC 230, the surrounding target area, and the high accuracy positioning UE performance information.

In procedure 612*c*-2, the LMC 230 determines the positioning method through the location information request from the RAN 200 or the AMF 301 through the RAN 200, the surrounding target area, and the high accuracy positioning UE performance information, and transfers the high accuracy positioning UE performance information to the UE 101. The LMC 230 may determine the high accuracy positioning UE performance information from the received location information request and the surrounding target area. The high accuracy positioning UE performance information may be the same contents as the contents described in the procedure 512 as described above in the first embodiment.

In procedure 612*c*-2, the LMC 230 may receive the response message to the high accuracy positioning UE performance information from the UE 101. The contents being performed by the UE 101 having received the response message in the procedure 612*c*-2 are the same as the procedures being performed by the UE 101 that receives the message of the procedure 512*a*-1/512*b*-1 in the first embodiment. The response message is transferred to the LMC 230 in the procedure 612*c*-2. The response message being received by the LMC 230 may be the same as the response message being received by the AMF 301 in the procedure 512*a*-2 or 512*b*-2 in the first embodiment.

The LMC 230 may transfer the corresponding response to the AMF 301 through the gNB 210 of the RAN 200 in procedure 612*c*-3.

Procedures after the procedure 614 are the same as the procedures after the procedure 514 in the first embodiment. Accordingly, the explanation of the same parts will be omitted.

In the present embodiment, a case where the location information is requested from the AF 307 or the LCS client 306 has been described. However, the location information request may be transferred from the UE 101 or the RAN 200.

In case that the location information is requested from the UE 101 or the RAN 200, the location information request may be transferred to the AMF 301. In this case, the AMF 301 may receive the location information request received by the H-GMLC 311 in the procedure 600 from the UE 101 or the RAN 200. The AMF 301 may receive the location information request as described in the procedure 600 from the UE 101 or the RAN 200, and may perform the same procedures as those performed by the V-GMLC 312 in the procedure 608. For example, the 5G enhanced location information included in the information request may be changed to the high accuracy surrounding information request. Thereafter, the AMF 301 may perform procedures subsequent to the procedure 610.

Third Embodiment

FIGS. 7A and 7B are signal flowcharts explaining a case where high accuracy UE positioning performance information is transferred to a UE through an LMF according to a third embodiment of the disclosure.

The signal flow in FIGS. 7A and 7B may be a continuous flow as described above with reference to FIGS. 5A and 5B. That is, after the signal flow of FIG. 7A, the signal flow of FIG. 7B may continue.

First, procedures 700 to 710 of FIG. 7A are the same as the procedures 500 to 510 in the first embodiment. Accordingly, duplicate explanation of the same parts will be omitted.

Next, in procedure 712 of FIG. 7B, the AMF 301 may select the LMF 303 that can provide the corresponding high accuracy positioning through the location information request and the surrounding target area information received from the (V-)GMLC 312. The AMF 301 may identify whether the previously allocated LMF 303 is present in the target UE 101 for requesting the location information. In case that the previously allocated LMF 303 is present for the target UE 101, the AMF 301 may identify (determine) whether the LMF 303 allocated for the target UE 101 can satisfy the service quality that is included in the location information request received in procedure 708. If it is identified (determined) that the allocated LMF 303 can provide the high accuracy location information service that satisfies the requested service quality, the AMF 301 may transfer the location information service request to the pre-allocated LMF 303 through the RAN 200 or the gNB 210. If it is identified (determined) that the LMF 303 allocated to the target UE 101 cannot satisfy the requested location information service quality, the AMF 301 may reallocate the LMF for the target UE 101, and may transfer toe location information request information and the surrounding target area information received in procedure 712*d*-1 to the newly designated LMF 303. In case that the AMF 301 newly designates the LMF, the AMF 301 may transfer request information for a periodic location information service for the existing target UE 101 together. The AMF 301 may transfer, to the LMF 303, the location information request from the LMF 303, the surrounding target area, and the high accuracy positioning UE performance information to the allocated or reallocated LMF.

In procedure 712*d*-1, the LMF 303 may receive, from the AMF 301, the location information request from the LMF 303, the surrounding target area, and the high accuracy positioning UE performance information.

In procedure 712*d*-2, the LMF 303 may determine the positioning method through the location information request, the surrounding target area, and the high accuracy positioning UE performance information received from the AMF 301, and may transfer the high accuracy positioning UE performance information to the UE 101. The LMF 303 may determine the high accuracy positioning UE performance information from the received location information request and the surrounding target area. The contents of the high accuracy positioning UE performance information is the same as the contents described in the procedure 512 in the first embodiment.

In procedure 712*d*-2, the LMF 303 may receive the response message to the high accuracy positioning UE performance information from the UE 101. The contents being performed by the UE 101 having received the high accuracy positioning UE performance information from the LMF 303 according to the procedure 712*d*-2 are the same as the procedures being performed by the UE 101 that receives the message of the procedure 512*a*-1/512*b*-1 in the first embodiment. The response message is transferred to the LMF 303 in the procedure 712*d*-2. The response message being received by the LMF 303 may be the same as the response message being received by the AMF 301 in the procedure 512*a*-2 or 512*b*-2 in the first embodiment.

The LMF 303 may transfer the corresponding response to the AMF 301 in procedure 712*d*-3.

Procedures after the procedure 714 are the same as the procedures after the procedure 514 in the first embodiment. Accordingly, the explanation of the same parts will be omitted.

In the present embodiment, a case in which the location information is requested from the AF 307 or the LCS client 306 has been described. However, the location information request may be transferred from the UE 101 or the RAN 200.

In case that the location information is requested from the UE 101 or the RAN 200, the location information request may be transferred to the AMF 301. In this case, the AMF 301 may receive the location information request received by the H-GMLC 311 in the procedure 700 from the UE 101 or the RAN 200. The AMF 301 may receive the location information request as described in the procedure 700 from the UE 101 or the RAN 200, and may perform the same procedures as those performed by the V-GMLC 312 in the procedure 708. For example, the 5G enhanced location information included in the information request may be changed to the high accuracy surrounding information request. Thereafter, the AMF 301 may perform procedures subsequent to the procedure 710.

Fourth Embodiment

Figure 8:
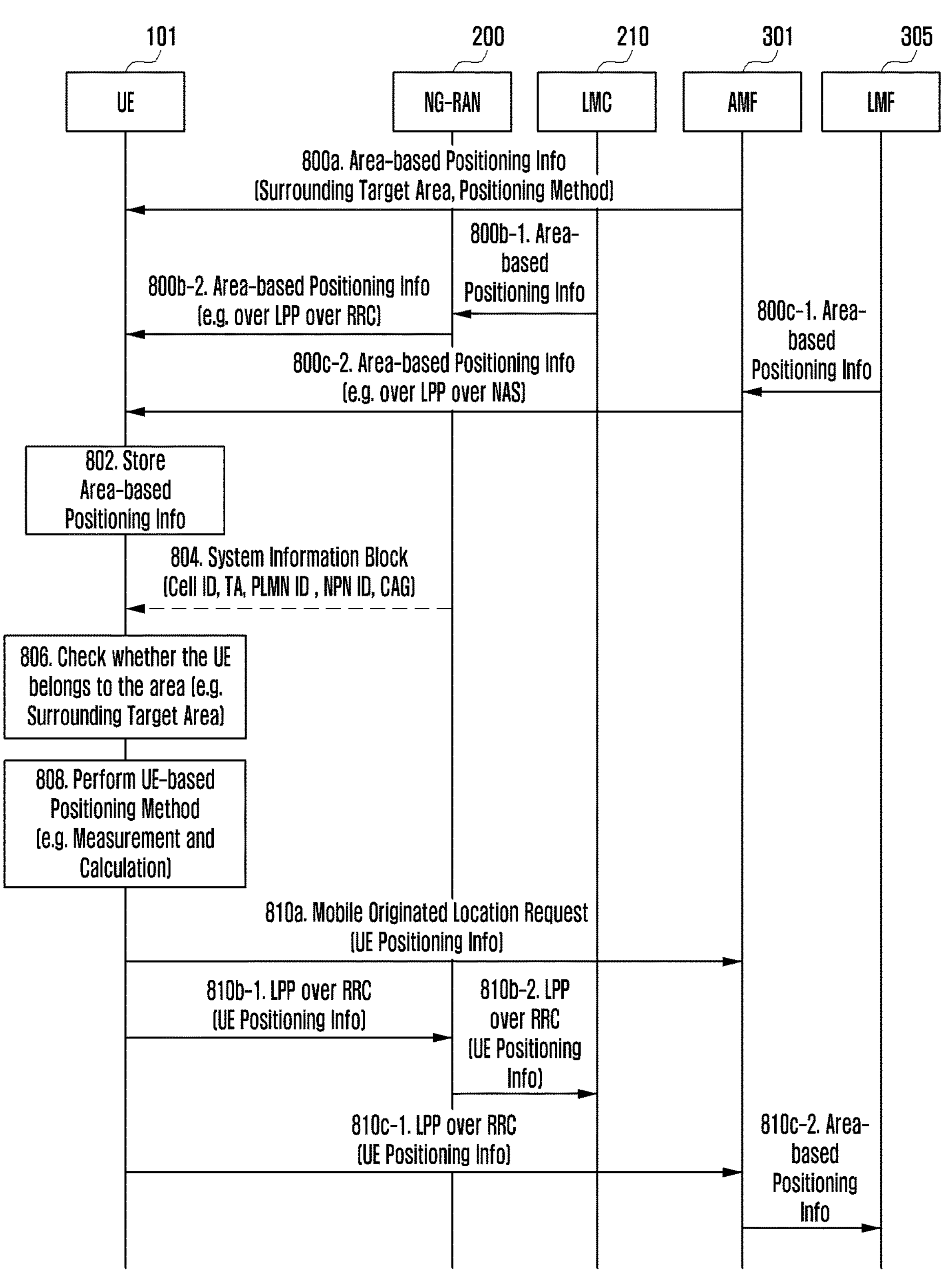
FIG. 8 is an exemplary diagram explaining an operation that is performed by a UE after receiving high accuracy positioning UE performance information including a surrounding target area according to a fourth embodiment of the disclosure.

FIG. 8 is an exemplary diagram explaining an operation that is performed by a UE after receiving high accuracy positioning UE performance information including a surrounding target area according to a fourth embodiment of the disclosure.

The UE 101 receives the surrounding target area 410 from the AMF 301, and if entry of the corresponding area is sensed, the UE 101 may notify a network of an accurate location of the UE 101 by starting a UE-based high accuracy positioning procedure. As in the second embodiment and the third embodiment, the UE 101 may receive the surrounding target area from the LMC 230 or the RAN node 210 or the LMF 303 in the RAN 200.

If the UE 101 enters the 5G enhanced positioning area 420, the LMC 230 or the LMF 303 may calculate the location of the UE 101 by performing a UE positioning procedure. The UE 101 may transfer the UE location information to the LCS client 306 having requested the UE location information.

In procedure 800, the UE 101 may receive the high accuracy UE positioning performance information from the AMF 301. The high accuracy UE positioning performance information that the UE 101 has received from the AMF 301 may include at least one of indexes representing the surrounding target area and the UE positioning method, or the UE positioning accuracy and the service response. The UE 101 may receive the UE positioning performance information from the AMF 301, the LMC 230, or the LMF 303.

In procedure 802, the UE 101 may store the high accuracy UE positioning performance information received from the AMF 301, the LMC 230, or the LMF 303.

In procedure 804, the UE 101 may receive at least one or two or more of a cell identifier (cell ID), a tracking area (TA), a PLMN, a non-public network (NPN) identifier (NPN-ID), or a closed access group ID (CAG ID) from system information block (SIB) that can grasp the location of the UE 101 in the 3GPP system having received the location of the UE 101 in the 3GPP from the base station on which the UE 101 camps.

In procedure 806, the UE 101 may identify (determine) whether the current location of the UE 101 is included in the surrounding target area by comparing information for determining the current location of the UE 101 at a location in the 3GPP received through the system information block (SIB) being broadcasted from the base station with the surrounding target area information included in the high accuracy UE positioning performance information received through the procedure 800.

If it is identified (determined) that the UE 101 is included in the current surrounding target area, the UE 101 may determine the positioning method to be performed by the UE 101 through the information included in the high accuracy UE positioning performance information received in the procedure 800. Examples of the high accuracy UE positioning performance information received in the procedure 800 may include at least one of the following pieces of information.

(1) High accuracy surrounding target area: This may be the surrounding target area information or an intersection area between the surrounding target area and the registration area of the UE.

(2) High accuracy positioning method index: This may include indexes representing assisted GNSS providing high accuracy positioning or assisted GNSS with real time kinematic (RTK), UWB, 3GPP cell-based OTDOA, Wi-Fi index, and BT.

(3) High accuracy positioning support environment information: Indoor positioning or outdoor positioning (4) High accuracy positioning type: This may be relative positioning or absolute positioning, or 3D positioning information including 2D information or a distance from the ground of the target UE.

(5) High accuracy positioning level: This may transfer a value for expressing the high accuracy positioning level. Table 2 is the same as the form exemplified as above.

(6) High accuracy positioning period: The UE includes an indicator that requests periodic positioning performance and the positioning period.

The UE 101 may determine the positioning method to be performed by the UE 101 or by the UE 101 and the network through the high accuracy positioning type, high accuracy positioning support environment information, high accuracy positioning level, or high accuracy positioning method indexes, and may activate the determined positioning operation.

In case that the current location of the UE 101 is not included in the surrounding target area, the UE 101 may stop the activation of the UE positioning operation, or may not activate the UE positioning operation. Even in case that the UE 101 deviates from the surrounding target area, the UE 101 may stop the activation or may not activate the UE positioning operation.

In case that the UE 101 determines to activate the UE positioning operation through the procedure 806, the UE 101, in procedure 808, may activate the UE positioning operation, and may perform the positioning operation. The UE 101 may perform a UE-based positioning operation. The UE-based positioning operation corresponds to a method in which the UE 101 measures a signal related to the positioning, and directly calculates the corresponding positioning. For example, in case that the UE 101 uses the GNSS type positioning technology, the UE 101 measures a satellite signal, and calculates the location of the UE 101 from the measured signal. If the UE 101 measures the location of the UE, the UE 101 may transmit the measured location of the UE 101 or the predicted location of the UE 101 to a server present in the network. The UE 101 may transfer the measured location information of the UE 101 to the LMC 230 through the base station. Alternatively, the UE 101 may transfer the measured location information of the UE 101 to the LMF 303 through the base station and the AMF 301.

As another method for measuring the location of the UE 101, the UE 101 may perform a UE-assisted positioning operation. The UE-assisted positioning method is a positioning method in which the UE 101 measures signals for the location positioning and transmits the measured information to the network, and a server present in the network calculates the location of the UE 101 by calculating signal information measured by the UE 101. The UE may transfer the signal information for the measured positioning to the server present in the network. The UE 101 may transfer the signal information that the UE 101 measures for the positioning to the LMC 230 through the RAN 200. Alternatively, the UE 101 may transfer the signal information measured for the UE positioning to the LMF 303 through the RAN 200 and the AMF 301.

In case that the UE positioning is activated as described above in the procedure 808, the UE 101, in procedure 810, may transfer the UE positioning information to the AMF 301 through procedure 810*a*. Alternatively, the UE 101 may transfer the positioning information to the LMC 230 through procedures 810*b*-1 and 810*b*-2, or may transfer the positioning information to the LMF 303 through procedures 810*c*-1 and 810*c*-2. The UE 101 may perform the procedure 810 after the UE positioning activation, may periodically receive the UE positioning request, and in case that the UE 101 should periodically perform the procedure 810, the UE 101 may perform the procedure 810 in order to perform the UE positioning after a threshold time elapses.

Further, the UE 101 may camp on a new base station due to the movement of the UE 101, and in case that the location of the UE 101 in the 3GPP system is changed and the UE enters the surrounding target area, the UE 101 may perform the procedure 810.

Fifth Embodiment

Figure 9:
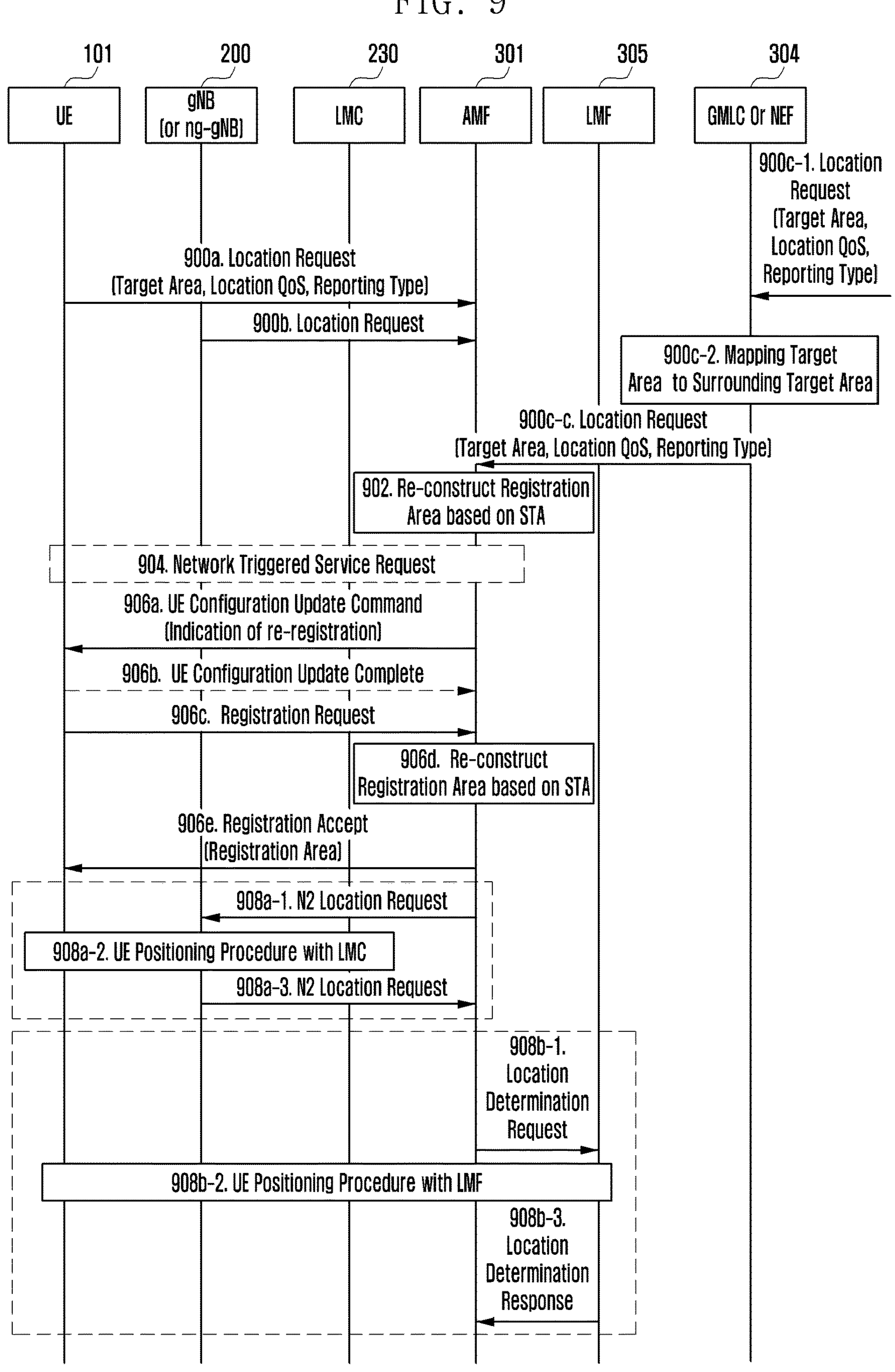
FIG. 9 is a signal flowchart explaining a high accuracy positioning control method based on a registration area according to a fifth embodiment of the disclosure.

FIG. 9 is a signal flowchart explaining a high accuracy positioning control method based on a registration area according to a fifth embodiment of the disclosure.

In procedure 900, a location information service client transfers a location information service request. The location information service may start through a request by the UE 101, the base station, or the external LCS client. This will be described in detail as follows.

At operation 900*a*, in case that the UE 101 starts the location information service, the UE 101 may transfer the location information request to the AMF 301 through a NAS message.

At operation 900*b*, the base station 200 may transfer the location information request to the AMF 301 through an N2 message.

At operation 900*c*, the LCS client (not illustrated in FIG. 9) outside the system may transfer the location information request through the GMLC 310 or the NEF 305. If the GMLC 310 receives the transferred location information service request, the GMLC 310 may transfer a UECM acquisition request to the UDM 302. The GMLC 310 receives, from the UDM 302, the identifier or address of the AMF 301 that manages the target UE for the location request. The GMLC 310 may transfer the location information request to the AMF 301.

The AMF 301 may receive a location information request message transferred from the UE 101, the base station 200, or the GMLC 310. In FIG. 9, in addition to the contents described at operations 900*a*/900*b*/900*c*, the AMF 301 may receive the location information request message transferred from the NEF 305. Further, the AMF 301 may receive the location information subscription request from the UDM 302. In the location providing request message or the location information subscription request message received by the AMF 301, information that may be included in the location providing request message as described above in the procedure 500 (500*a*, 500*v*-1, and 500*b*-2) of the first embodiment may be a target UE identifier, requester's identifier, request transaction delimiter, information on the location information service quality (location QoS), location information service information, and high accuracy positioning request information. The high accuracy positioning request information may include at least one of a high accuracy positioning request indicator, high accuracy positioning method, high accuracy positioning support type, and 5G enhanced positioning service area, for example, the 5G enhanced positioning service area index, 5G enhanced positioning service area identification number, GAD information of the 5G enhanced positioning service, and characteristic information of the 5G enhanced positioning service area.

In procedure 900*c*-2, the GMLC 310 or the NEF 305 may perform a function of mapping the surrounding target area information from the received 5G enhanced positioning service area information. The GMLC 310 or the NEF 305 may receive the 5G enhanced positioning service area information included in the location information request. It is possible to change the received 5G enhanced positioning service area information to the surrounding target area information. The surrounding target area information may be preconfigured with respect to the target area that is provided by the high accuracy positioning service being provided by the GMLC 310. Alternatively, the surrounding target area information may be dynamically designated from the information received from the request.

The surrounding target area information may be a cell list, a TA list, an area of interest, and presence reporting area. The GMLC 310 may transmit both the surrounding target area information and an indicator indicating that the corresponding area is the 5G enhanced service area to the AMF 301.

The AMF 301 having received the location information request in procedure 902 may change the 5G enhanced positioning service area received from the UE, base station, GMLC 310, or NEF 305 to the surrounding target area information. The surrounding target area information may be preconfigured with respect to the target area in which the high accuracy positioning service that is provided by the GMLC 310 is provided. Alternatively, the surrounding target area information may be dynamically designated from the information received from the request. The surrounding target area information may be the cell list, TA list, area of interest, and presence reporting area. Alternatively, the AMF 301 may receive the information that has already been changed from the 5G enhanced service area to the surrounding target area from the GMLC 310 or the NEF 305.

In procedure 904, in case that the UE 101 is in a CM idle state, the AMF 301 may perform a network trigger service request procedure.

In procedure 906, the AMF 301 may identify (determine) whether the UE 101 belongs to the 5G enhanced positioning service area. In case that the current location of the UE 101 belongs to the 5G enhanced positioning service area 420, the AMF 301 may constitute the registration area with a tracking area list including the 5G enhanced positioning service area 420. In case that the current location of the UE 101 does not belong to the 5G enhanced positioning service area 420, and the 5G enhanced positioning service area 420 is included in the registration area, the AMF 301 may reconfigure the registration area with the tracking area excluding the 5G enhanced positioning service area 420. Alternatively, the AMF 301 may constitute the registration area with the surrounding target area 410.

In procedure 906, the AMF 301 may make the UE 101 trigger the registration procedure performance through a UE configuration update procedure. The AMF 301 may transfer a UE configuration update command message to the UE 101 (906*a*), and may request the UE 101 to perform the registration request. The AMF 301 may constitute the registration area with the surrounding target area 410, and may transfer the registration area configured by the surrounding target area 410 to the UE 101.

The UE 101 having been requested to transmit the registration request message through the UE configuration update command message may start the registration procedure by transmitting the message of procedure 906*c* to the AMF 301.

The AMF 301 may receive the registration request message from the UE 101, and may identify (determine) the followings.

(1) In case that the UE deviates from the registration area that is configured by the surrounding target area 410, the AMF 301 may determine to deactivate the high accuracy UE location positioning procedure.

(2) In case that the UE that is outside the surrounding target area 410 enters the surrounding target area 410, the AMF 301 may determine to activate the high accuracy UE location positioning procedure.

In procedure 908, in case that the AMF 301 senses the entry to the surrounding target area 410, and determines to activate the high accuracy UE positioning procedure, the AMF 301 may activate the high accuracy UE positioning procedure by transmitting a message of procedure 908*a*-1 or procedure 908*b*-1. The UE 101 may measure the location of the UE 101 by performing the UE-based positioning method or the UE-assisted positioning method.

In case that the location information request is the request for reporting the entry or secession of the 5G enhanced positioning service area 420, and the LMC 230 or the LMF 303 senses the entry or the secession of the requested 5G enhanced positioning service area 420 as the result of the high accuracy location measurement, the LMC 230 or the LMF 303 may report this to the AMF 301 (908*a*-3 and 908*b*-3). The AMF 301 having received such an event may transfer the UE positioning information to the UE 101, the base station 210, the GMLC 310 or the NEF 305, which is a node having requested the location information. The UE location information may be transferred to the LCS client 306 having requested through the GMLC 310 or the NEF 305.

Sixth Embodiment

Figure 10:
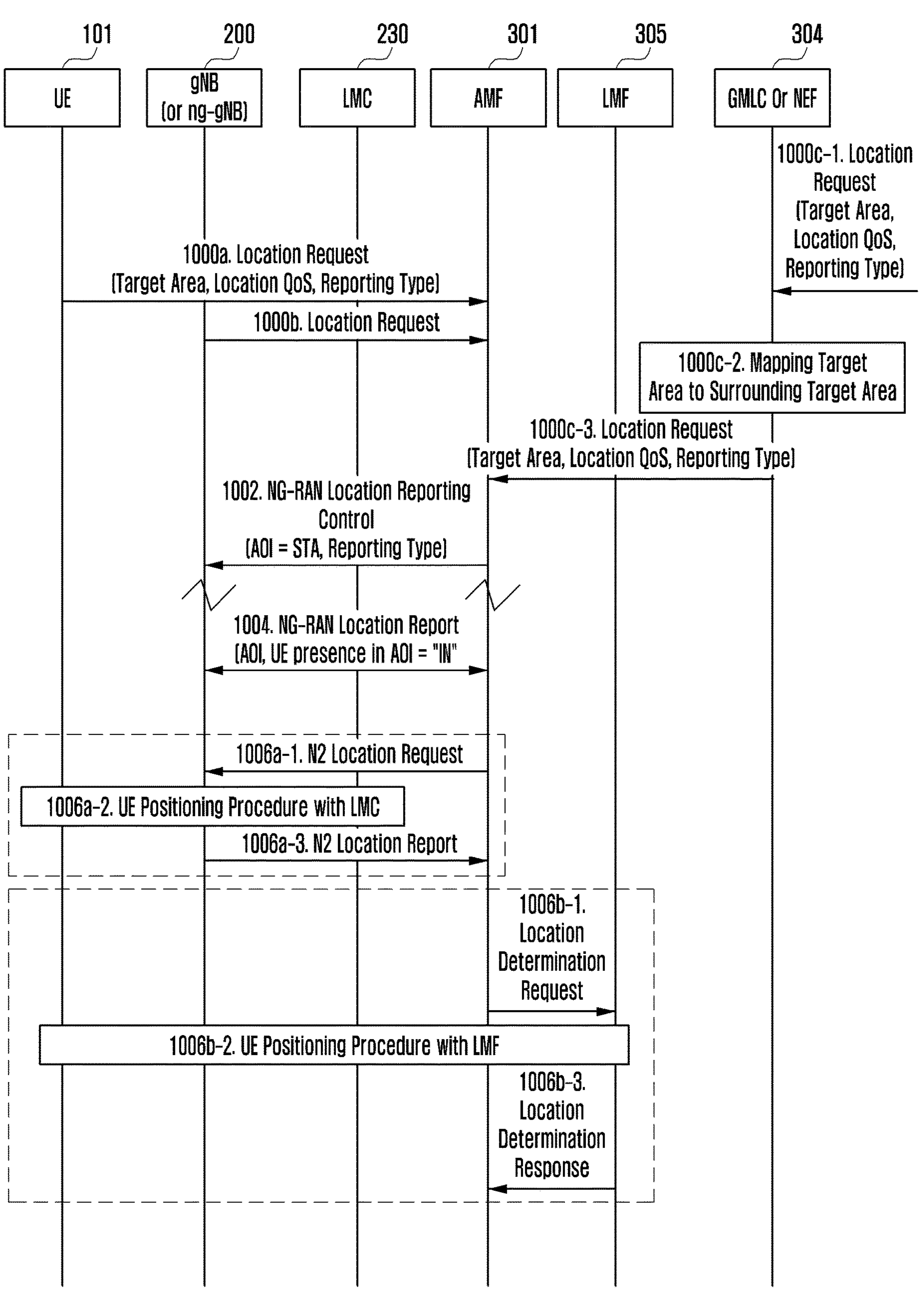
FIG. 10 is a signal flowchart of a case where high accuracy positioning is controlled after a region of interest is configured based on a network according to a sixth embodiment of the disclosure.

FIG. 10 is a signal flowchart of a case where high accuracy positioning is controlled after a region of interest is configured based on a network according to a sixth embodiment of the disclosure.

With reference to FIG. 10, the AMF 301 may configure the area of interest corresponding to the surrounding target area, and may start UE position tracking in the 3GPP system by transferring a location report control message to the RAN 200, that is, NG-RAN 200. The RAN 200 may sense the entry or secession of the UE 101 into or from the area of interest included in the location report control. In case that the NG-RAN 200 senses the entry of the UE 101 into the area of interest, it may report the location of the UE 101 in the 3GPP system of the UE 101 to the AMF 301. The AMF 301 may receive the location of the UE 101 in the 3GPP system, which is reported from the RAN 200, and in case that the entry of the UE 101 into the surrounding target area is sensed, the AMF 301 may transfer a request to start the high accuracy positioning to the LMC 230 or the LMF 303. The AMF 301 may receive the UE location in the 3GPP system, being reported from the RAN 200, may sense the secession from the surrounding target area of the UE 101, and if it is determined that the high accuracy positioning performance request for the corresponding area is in progress with respect to the UE 101, and there is no further location information request, the AMF 301 may transfer the request to stop the high accuracy positioning performance to the LMC 230 or the LMF 303.

Procedure 1000 (1000*a*, 1000*b*, 1000*c*-1, 1000*x*-2, and 1000*c*-3) is the same as the procedure 900 as described above in the fifth embodiment.

In procedure 1002, the AMF 301 having received the location information request from the UE 101, base station, GMLC 310, or NEF 305 through the procedure 1000 may change the received target area to the mapped surrounding target area information. The surrounding target area information 420 may be preconfigured for the target area in which the high accuracy positioning service, being provided from the AMF 301, is provided. Alternatively, the surrounding target area information may be dynamically designated from the information received from the request. The surrounding target area information 420 may be configured as the cell list, tracking area list, area of interest, and presence reporting area. Alternatively, the AMF 301 may receive the information that has already been changed from the 5G enhanced service area 420 to the surrounding target area from the GMLC 310 or the NEF 305.

In procedure 1002, the AMF 301 may constitute the area of interest corresponding to the surrounding target area 410, and may start the UE location tracking in the 3GPP system by transferring the location report control message to the RAN 200, that is, NG-RAN 210 (1006*a*-1). Accordingly, in procedure 1004, the RAN 210 may transmit the location report control message to the AMF 301. The location report control message may include at least one of the area of interest, location report type, and identifier for discriminating the location request.

The RAN 200 may sense the change of the location information of the UE 101 (1006*a*-2). The location information of the UE 101 may include entry into an area of interest, movement in the area of interest, secession from the area of interest, or change of the UE present in the area of interest. The presence information in the area of interest of the UE 101 may be expressed as IN, OUT, or UNKNOWN state.

In procedure 1006, in case that the presence information of the area of interest of the UE 101 is changed to the UNKNOWN state due to the entry of the UE 101 into the area of interest, secession of the UE 101 from the area of interest, or change of the information on the area of interest to the UE RRC state information, the RAN 200 may transmit the location information report message to the AMF 301 (1006*a*-3). The AMF 301 may receive the UE presence information for the area of interest from the RAN 200.

In procedure 1008, the AMF 301 may receive the presence (existence or location) of the UE 101 for the area of interest, being reported from the RAN 200, and in case that the AMF 301 changes the UE presence in the area of interest to OUT, IN, or UNKNOWN, or the UE presence information is changed from OUT to IN, the AMF 301 may start the location information procedure. In case that the LMC 230 is applied to the RAN 200, the AMF 301 may transmit the location information request to the RAN 200 in order to perform the LMC-based positioning procedure. In case that the method for the LMF 303 is applied, the AMF 301 may start the positioning procedure based on the LMF 303 by transferring a location determination request to the LMF 303 (1006*b*-1).

Seventh Embodiment

Figure 11:
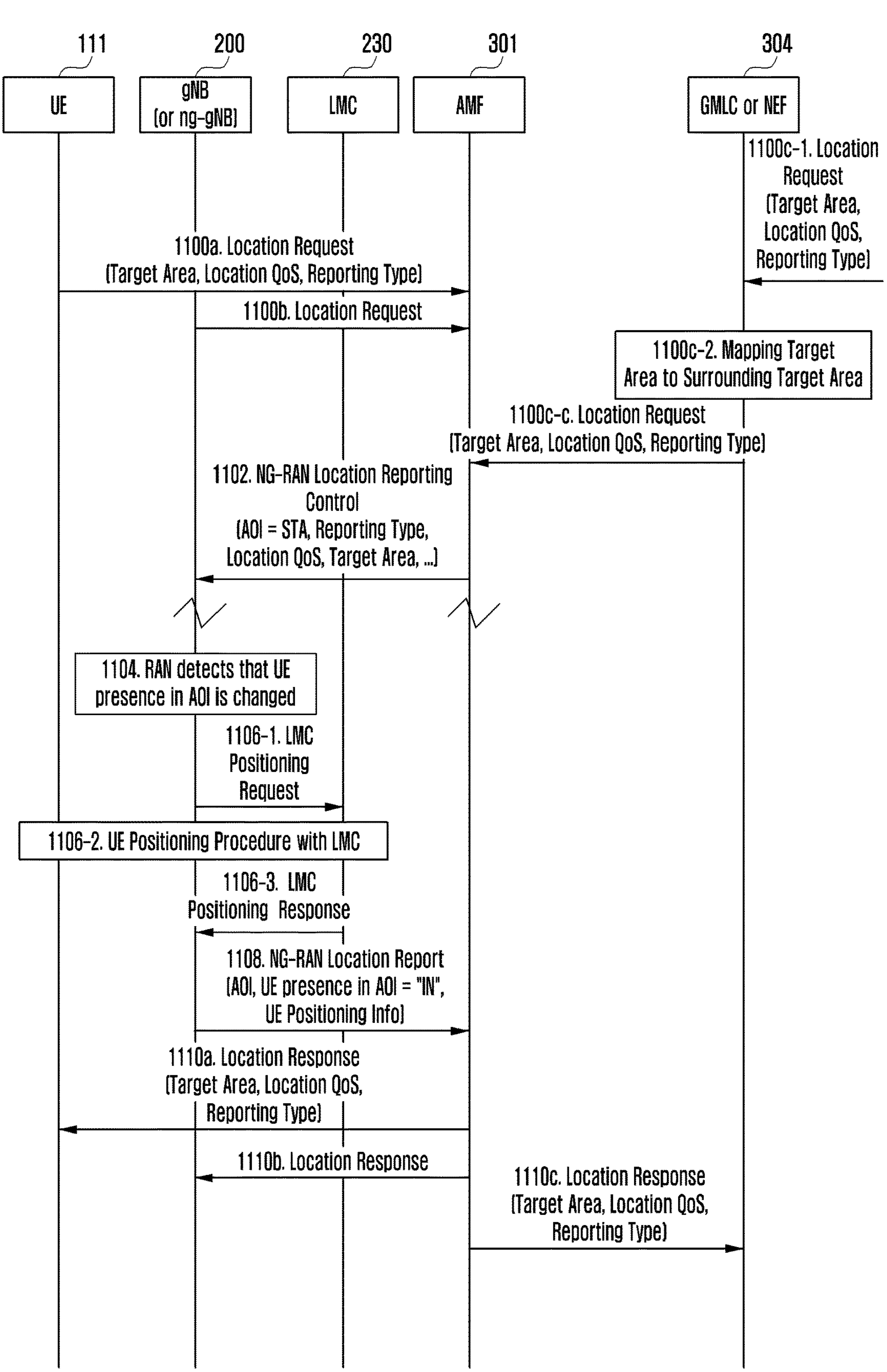
FIG. 11 is a signal flowchart in case of performing a UE positioning procedure by using a location reporting control message according to a seventh embodiment of the disclosure.

FIG. 11 is a signal flowchart in case of performing a UE positioning procedure by using a location reporting control message according to a seventh embodiment of the disclosure.

Hereinafter, with reference to FIG. 11, a method will be described, in which the AMF 310 requests location information from the RAN 200, changes the target area to the surrounding target area 410 to configure the changed area as the area of interest of the UE 101, and in case that the UE 101 enters into or secedes from the surrounding target area 420 configured as the area of interest, the RAN node 210 makes the LMC 230 connected to the RAN 200 to perform the UE positioning procedure.

Procedure 1100 is the same as the procedure 1000 of the sixth embodiment.

In the procedure 1102, the AMF 301 having received the location information request from the GMLC 310 or the NEF 305 may change the received target area to the mapped surrounding target area information 410. The surrounding target area information 420 may be preconfigured for the target area in which the high accuracy positioning service, being provided from the AMF 301, is provided. Alternatively, the surrounding target area information may be dynamically designated from the information received from the request. The surrounding target area information may be configured as the cell list, tracking area list, area of interest, and presence reporting area.

Alternatively, the AMF 301 may receive the information that has already been changed from the 5G enhanced service area 420 to the surrounding target area from the GMLC 310 or the NEF 305. The AMF 301 may configure the area of interest for the target UE 101 as the surrounding target area 410 corresponding to the target area of the location information request (1102). In case that the UE 101 is located within the surrounding target area 410, the AMF may include an indicator for operating the high accuracy positioning that satisfies the service quality in the location information request to be transferred to the RAN node 200 or 210 (1102). The RAN 200 may receive a location reporting control message (1102), and may track the presence (existence or location) of the UE in the area of interest of the UE 101. The UE tracking operation may include at least one of sensing of the entry of the UE into the area of interest, sensing of the secession of the UE from the area of interest, or sensing of the change of the presence information for the area of interest of the UE due to the change of the RRC state of the UE.

In procedure 1104, in case that the RAN node 200 receives the indicator indicating to perform the location information request when being located in the surrounding target area 410, and in case that the presence of the RAN node 200 in the area of interest of the target UE is changed to IN or UNKNOWN, the UE 101 may determine to start the UE positioning procedure through the LMC 230. The RAN node 200 may determine to stop the UE positioning procedure in the LMC 230 by tracking the secession of the UE 101 to the surrounding target area or RRC state.

In procedure 1106-1, the RAN node 200 having determined the start of the UE positioning procedure may transmit a message (LMC positioning request) for requesting the start of the LMC positioning procedure to the LMC 230. The LMC positioning request message may include a location report type that the RAN node 200 receives from the procedure 1102, location information quality information, and UE target area (or 5G enhanced positioning service area 420). Further, in order to determine more accurate positioning technology, the LMC positioning message may include a target UE identifier included in the location information request received by the AMF 301 in the procedure 1100, requester's identifier, request transaction delimiter, information on the location information service quality (location QoS), location information service information, and high accuracy positioning request information. The high accuracy positioning request information may include a high accuracy positioning request indicator, high accuracy positioning method, high accuracy positioning support type, and 5G enhanced positioning service area, for example, the 5G enhanced positioning service area index, 5G enhanced positioning service area identification number, GAD information of the 5G enhanced positioning service, and characteristic information of the 5G enhanced positioning service area.

In procedure 1106-2, the LMC 230 may receive the LMC positioning request message from the base station node 200, and may perform the UE positioning procedure through the UE and a positioning protocol (e.g., LPP).

In procedure 1106-3, the LMC 230 having successfully performed the positioning procedure with the UE 101 may transfer an LMC positioning response to the RAN node 200.

In procedure 1108, the RAN node 200 may receive an LMC positioning response message from the LMC 230.

This message may include at least one or two or more of the UE movement distance as compared with the last report (previous report), and the UE location expressed by the GAD (e.g., UE location expressed by altitude/longitude).

In procedure 1102, in case that the location report triggering condition requested from the AMF 301 is satisfied, the RAN 200 may transfer the location report message to the AMF 301 in the procedure 1108. Examples of the requested location report triggering conditions may include at least one of the following pieces of information.

1) Enter into or secession from the target area
2) Report period expiration after the last report
3) Movement of a distance over a threshold value in the target area In case that the location request is received from the UE 101 in procedure 1100*a*, the AMF 301 may transmit a response by performing the procedure 1110*a*. In case that the location information request is received from the base station in procedure 1100*b*, the AMF 301 may transmit a response by performing the procedure 1110*b*. In case that the location information request is received from the GMLC 310 or the NEF 305 in procedure 1100*c*, the AMF 301 may transmit a response by performing the procedure 1110*c*.

The location information response message may include the contents that the AMF 301 has received from the RAN node 200.

Figure 13:
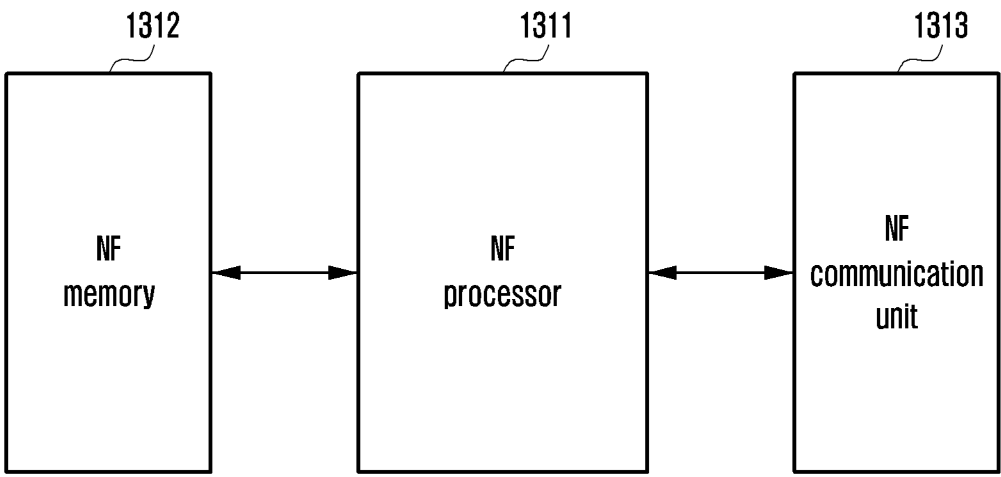
FIG. 13 is a block diagram of each device constituting a 3GPP network according to the disclosure.

FIG. 13 is a block diagram of each device constituting a 3GPP network according to the disclosure.

In FIG. 13, the NF may be commonly applied to not only the NF 307 as described above with reference to FIGS. 1 to 3, 5A and 5B to 7A and 7B but also the AMF 301, LMF 231, GMLC 310, 311, and 312, UDM 302, LCS client 306, and NEF 305 in all.

An NF memory 1312 is an area for storing control information for performing the corresponding NF function and data being generated, and may be at least one of various storage media, such as hard disk, RAM, and ROM.

An NF processor 1311 may be the subject to read the information stored in the NF memory 1312 and to perform the corresponding control operation. Accordingly, the NF processor 1311 may control interpretation, generation, and/or storage of messages being transmitted and received between the NFs and/or UE 101. The NF processor 1311 may be implemented by at least one or two or more processors.

An NF communication unit 1313 may receive information from another NF and/or the UE 101 through corresponding interface methods, and may provide the received information to the NF processor 1311. Further, the NF communication unit 1313 may provide the information being provided from the NF processor 1311 to another NF and/or the UE based on the control of the NF processor 1311.

In addition to the constitutions of FIG. 13 as described above, a separate interface for operator's management may be further included. Further, in case that the NF is implemented in the form of a network slice, the constitutions may be the minimum constitutions for constituting one network slice. Further, in case that the NF is implemented in the form of a network slice, the constitutions of FIG. 13 may correspond to all network slices or two or more network slices.

Figure 14:
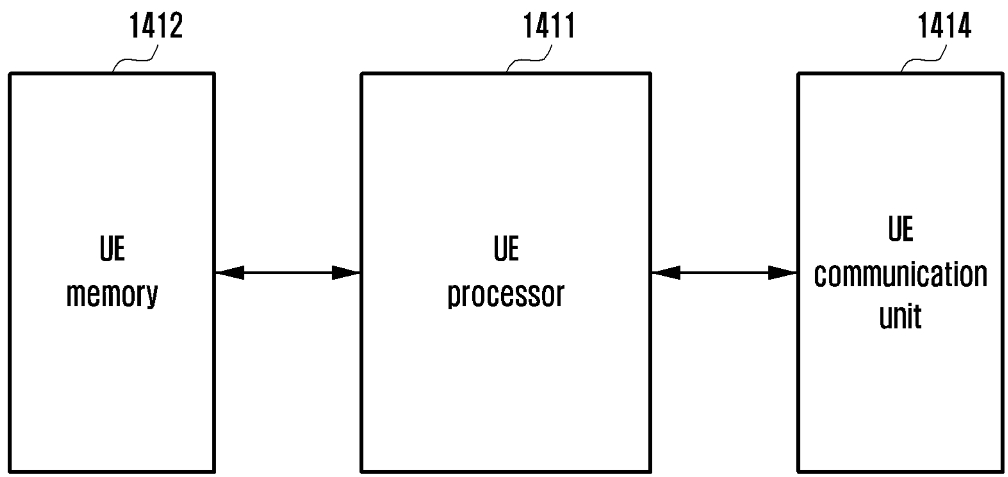
FIG. 14 is a block diagram of a UE according to the disclosure.

FIG. 14 is a block diagram of a UE according to the disclosure. The block configuration of the UE exemplified in FIG. 14 is exemplified as the minimum constitutions to explain the contents of the disclosure.

Further, it is to be noted that any constitution for the UE positioning has not been exemplified in FIG. 14. The UE positioning device may further include a separate positioning device in accordance with the at least one of the above-described methods.

A UE memory 1412 may include an area for storing control information needed to apply the above-described UE positioning method and/or information needed by a user. The UE memory 1412 may include at least one or two or more of a hard disk, RAM, and ROM.

A UE processor 1411 may perform various kinds of controls to read data stored in the UE memory 1412 and to perform the positioning operation described in the disclosure. Further, the UE processor 1411 may control on/off operations of the positioning device based on the indication of the network. Further, the UE processor 1411 may control to interpret the information received from the network and to store at least a part of the information in the UE memory 1412. Further, the UE processor 1411 may control a UE communication unit 1413 to provide information in accordance with the result of the positioning to the AMF and/or the LMF 231 through the network, for example, through the RAN 200. The above UE processor 1411 may be implemented by at least one or two or more processors.

The UE communication unit 1413 may include an air interface for being driven in the 3GPP network of the mobile communication UE. The UE communication unit 1413 may include a modem and/or a communication processor (CP) and/or an RF module and/or at least one antenna.

Further, although not exemplified in FIG. 14, an additional constitution for the UE positioning, for example, a Wi-Fi communication unit, GPS receiver, geomagnetic sensor, acceleration sensor, and altitude sensor, may be provided, and they may be collectively called a positioning unit. Further, the positioning unit may be activated and/or deactivated under the control of the UE processor 1411, and in case that a plurality of constituent elements are provided, the constituent elements for one or two or more positioning may be activated or deactivated as needed.

INDUSTRIAL APPLICABILITY

The disclosure can be used in case of controlling more accurate positioning while reducing the power consumption of the UE in the mobile communication system.

The invention claimed is:

1. A method performed by a user equipment (UE) in a communication system, the method comprising:

receiving, from a location management function (LMF) device of the communication system, a message including information of a target area for tracking a location of the UE and at least one positioning method;

identifying whether the UE is inside the target area received from the LMF device; and in case that the UE is inside the target area:

identifying the location of the UE, by using a specific positioning method assigned for the target area from among the at least one positioning method; and transmitting, to the LMF device, a report message including the location of the UE, wherein the information of the target area is determined, by a gateway mobile location center (GMLC) of the communication system, based on converting a positioning service area into a list of one or more tracking areas, and the target area is mapped the list of the one or more tracking areas, wherein the identifying of whether the UE is inside the target area includes identifying whether the UE is inside the one or more tracking areas, wherein the message further includes a level of positioning accuracy, and wherein the specific positioning method assigned for the target area corresponding to at least one of an assisted global navigation satellite system (GNSS), or an observed time difference of arrival (OTDOA).

2. The method of claim 1, wherein the message further includes a positioning period.

3. The method of claim 1, wherein the target area includes the positioning service area.

4. A user equipment (UE) in a communication system, the UE comprising:

a transceiver; and a processor coupled with the transceiver, the processor configured to:

receive, from a location management function (LMF) device of the communication system, a message including information of a target area for tracking a location of the UE and at least one positioning method, identify whether the UE is inside the target area received from the LMF device, and in case that the UE is inside the target area:

identify the location of the UE, by using a specific positioning method assigned for the target area from among the at least one positioning method, and transmit, to the LMF device, a report message including the location of the UE, wherein the information of the target area is determined, by a gateway mobile location center (GMLC) of the communication system, based on converting a positioning service area into a list of one or more tracking areas, and the target area is mapped the list of the one or more tracking areas, wherein the identifying of whether the UE is inside the target area includes identifying whether the UE is inside the one or more tracking areas, wherein the message further includes a level of positioning accuracy, and wherein the specific positioning method assigned for the target area corresponding to at least one of an assisted global navigation satellite system (GNSS), or an observed time difference of arrival (OTDOA).

5. The UE of claim 4, wherein the message further includes a positioning period.

6. The UE of claim 4, wherein the target area includes the positioning service area.

* * * * *